(12) United States Patent
Seok et al.

(10) Patent No.: US 9,629,078 B2
(45) Date of Patent: Apr. 18, 2017

(54) METHOD FOR TRANSCEIVING DATA ON BASIS OF SERVICE PERIOD SCHEDULING IN WIRELESS LAN SYSTEM AND APPARATUS FOR SUPPORTING SAME

(71) Applicant: LG ELECTRONICS INC., Seoul (KR)

(72) Inventors: Yong Ho Seok, Anyang-si (KR); Hyang Sun You, Anyang-si (KR); Jong Hyun Park, Anyang-si (KR)

(73) Assignee: LG Electronics Inc., Seoul (KR)

( * ) Notice: Subject to any disclaimer, the term of this patent is extended or adjusted under 35 U.S.C. 154(b) by 92 days.

(21) Appl. No.: 14/238,731

(22) PCT Filed: Nov. 22, 2012

(86) PCT No.: PCT/KR2012/009942
§ 371 (c)(1),
(2) Date: Feb. 12, 2014

(87) PCT Pub. No.: WO2013/077653
PCT Pub. Date: May 30, 2013

(65) Prior Publication Data
US 2014/0204821 A1    Jul. 24, 2014

Related U.S. Application Data

(60) Provisional application No. 61/563,498, filed on Nov. 23, 2011.

(51) Int. Cl.
*H04W 52/02* (2009.01)
*H04W 74/04* (2009.01)

(52) U.S. Cl.
CPC ... *H04W 52/0206* (2013.01); *H04W 52/0216* (2013.01); *H04W 74/04* (2013.01); *Y02B 60/50* (2013.01)

(58) Field of Classification Search
None
See application file for complete search history.

(56) References Cited

U.S. PATENT DOCUMENTS

| | | | |
|---|---|---|---|
| 7,899,451 B2 * | 3/2011 | Hu et al. | 455/422.1 |
| 2004/0264397 A1 | 12/2004 | Benveniste | |
| 2006/0285526 A1 * | 12/2006 | Jang et al. | 370/338 |
| 2007/0226351 A1 | 9/2007 | Fischer et al. | |
| 2008/0159183 A1 * | 7/2008 | Lindoff et al. | 370/278 |
| 2009/0239566 A1 * | 9/2009 | Pelletier et al. | 455/517 |
| 2010/0184458 A1 * | 7/2010 | Fodor et al. | 455/522 |

(Continued)

FOREIGN PATENT DOCUMENTS

| | | |
|---|---|---|
| EP | 1734698 A1 | 12/2006 |
| JP | 2004128949 A | 4/2004 |

(Continued)

*Primary Examiner* — Chi H Pham
*Assistant Examiner* — Ronald H Davis
(74) *Attorney, Agent, or Firm* — Dentons US LLP

(57) ABSTRACT

Provided is a method for transceiving data in a wireless LAN system on the basis of station (STA)-based service period scheduling. The method comprises entering an awake state, configuring a service period for transceiving an access point (AP) and data, transceiving the AP and the data during the service period, and entering a doze state when the service period ends.

4 Claims, 24 Drawing Sheets

(56) References Cited

U.S. PATENT DOCUMENTS

| | | | |
|---|---|---|---|
| 2010/0284316 A1* | 11/2010 | Sampathkumar | 370/311 |
| 2011/0110340 A1 | 5/2011 | Lakkis | |
| 2012/0176950 A1* | 7/2012 | Zhang et al. | 370/311 |
| 2014/0022974 A1* | 1/2014 | Eriksson et al. | 370/311 |
| 2014/0241227 A1* | 8/2014 | Wu et al. | 370/311 |

FOREIGN PATENT DOCUMENTS

| | | |
|---|---|---|
| JP | 2009-523372 A | 6/2009 |
| JP | 2011-120064 A | 6/2011 |
| KR | 10-2006-0083935 A | 7/2006 |
| KR | 10-2010-0062875 A | 6/2010 |
| KR | 10-1023639 B1 | 3/2011 |
| WO | 2004/079983 A1 | 9/2004 |
| WO | 2007082235 A1 | 7/2007 |
| WO | 2007-137251 A2 | 11/2007 |
| WO | 2011115408 A2 | 9/2011 |

* cited by examiner

_METHOD FOR TRANSCEIVING DATA ON BASIS OF SERVICE PERIOD SCHEDULING IN WIRELESS LAN SYSTEM AND APPARATUS FOR SUPPORTING SAME_

This application is a 35 USC §371 National Stage entry of International Application No. PCT/KR2012/009942, filed on Nov. 22, 2012, and claims priority to U.S. Provisional Application No. 61/563,498 filed Nov. 23, 2011, each of which is hereby incorporated by reference in its entirety.

BACKGROUND OF THE INVENTION

Field of the Invention

The present invention concerns wireless communications, and more specifically, to methods of scheduling a service period for transmission of data in a Wireless Local Area Network (WLAN) system and transmitting and receiving data based on the service period and apparatuses supporting the same.

Related Art

With the growth of information communication technology, various wireless communication technologies have been recently developed. Among others, Wireless Local Area Network (WLAN) is a technology that allows for wireless access to the Internet at home or business or in a specific service area using a handheld terminal such as a personal digital assistant (PDA), a laptop computer, a portable multimedia player (PMP), etc.

IEEE 802.11n is a technology standard that has been recently established in order to overcome the limit to communication speed that has been recognized as a weakness of WLAN. IEEE 802.11n aims to increase network speed and reliability and expand coverage of a wireless network. More specifically, the IEEE 802.11n system adopts MIMO (Multiple Inputs and Multiple Outputs) technology that uses multiple antennas at both a transmission unit and a reception unit thereof so as to optimize data speed and to minimize transmission errors while supporting a high throughput (HT) of data processing speed up to 540 Mbps.

In the WLAN system, a station (STA) supports a power save mode. The station may prevent unnecessary power consumption by entering into a doze state. In case there is traffic associated with data that intends to be sent to a STA that is operating in a doze state, an access point (AP) may notify this to the STA. The STA recognizes existence of traffic associated with data intended to be sent thereto and may request that the AP be sending it to the STA. The AP may transmit a frame in response to the STA's request.

Meanwhile, if an AP can transmit only one frame in response to a request of an STA that has entered into the awake state, it may be insufficient in light of data processing. Further, in order to receive frames, the STA shifts between awake state and doze state more frequently, thus deteriorating efficiency in terms of power saving operation. Accordingly, a need exists for a method for scheduling a service period that may support an efficient operation of the STA.

SUMMARY OF THE INVENTION

An object of the present invention is to provide a method of scheduling a service period for transmission/reception of data in a Wireless Local Area Network (LAN) system and transmitting and receiving data based on the service period and an apparatus supporting the same.

In an aspect, a service period scheduling-based data transmission and reception method by a station (STA) in a WLAN system is provided. The method includes entering into an awake state, configuring a service period for data transmission and reception with an access point (AP), transmitting and receiving data to/from the AP during the service period, and entering into a doze state when the service period is ended.

The step of configuring the service period may include exchanging a scheduled service period start request frame and a scheduled service period start response frame.

The step of exchanging the scheduled service period start request frame and the scheduled service period start response frame may include receiving the scheduled service period start request frame from the AP, and sending the scheduled service period start response frame to the AP.

The service period may be initiated by sending the scheduled service period start response frame to the AP.

Duration of the service period may be indicated by a duration field of the scheduled service period start request frame.

The scheduled service period start request frame further includes a service period interval field indicating an interval between two service periods.

A second service period may be initiated the interval indicated by the service period interval field after the service period is ended.

The step of exchanging the scheduled service period start request frame and the scheduled service period start response frame may include sending the scheduled service period start request frame to the AP, and receiving the scheduled service period start response frame from the AP.

The service period may be initiated by sending the scheduled service period start request frame to the AP.

Duration of the service period may be indicated by a duration field of the scheduled service period start request frame.

The scheduled service period start request frame may further include a service period interval field indicating an interval between two service periods.

A second service period may be initiated the interval indicated by the service period interval field after the service period is ended.

The method may further include receiving a data frame from the AP within the service period, and sending an acknowledgement (ACK) frame to the AP in response to the data frame. When the data frame includes an End Of Service Field (EOSP) field indicating an end of the service period, the service period may be ended after the ACK frame is sent.

The method may further include receiving a Contention Free (CF)-end frame from the AP within the service period, wherein the service period is ended after the CF-end frame is received.

The method may further include sending, from the STA, a frame indicating that the service period is ended. The service period may be ended after the frame is sent.

In another aspect, a wireless device operating in a WLAN system is provided. The wireless device includes a transceiver transmitting and receiving a radio signal and a processor operatively coupled with the transceiver. The processor is configured to enter into an awake state, configure a service period for data transmission and reception with an access point (AP), transmit and receive data to/from the AP during the service period, and enter a doze state after the service period is ended.

The AP and the STA configure a service period by signaling information on the service period. The STA which operates in the power save mode may communicate data with the AP at least once during a specific service period and may switch between the awake state and the doze state in compliance with the start and end time of the service period. By doing so, the STA's power saving efficiency may be increased, and efficient data transmission/reception is guaranteed, thus leading to an enhanced data throughput for the WLAN system.

DESCRIPTION OF EXEMPLARY EMBODIMENTS

Figure 1:
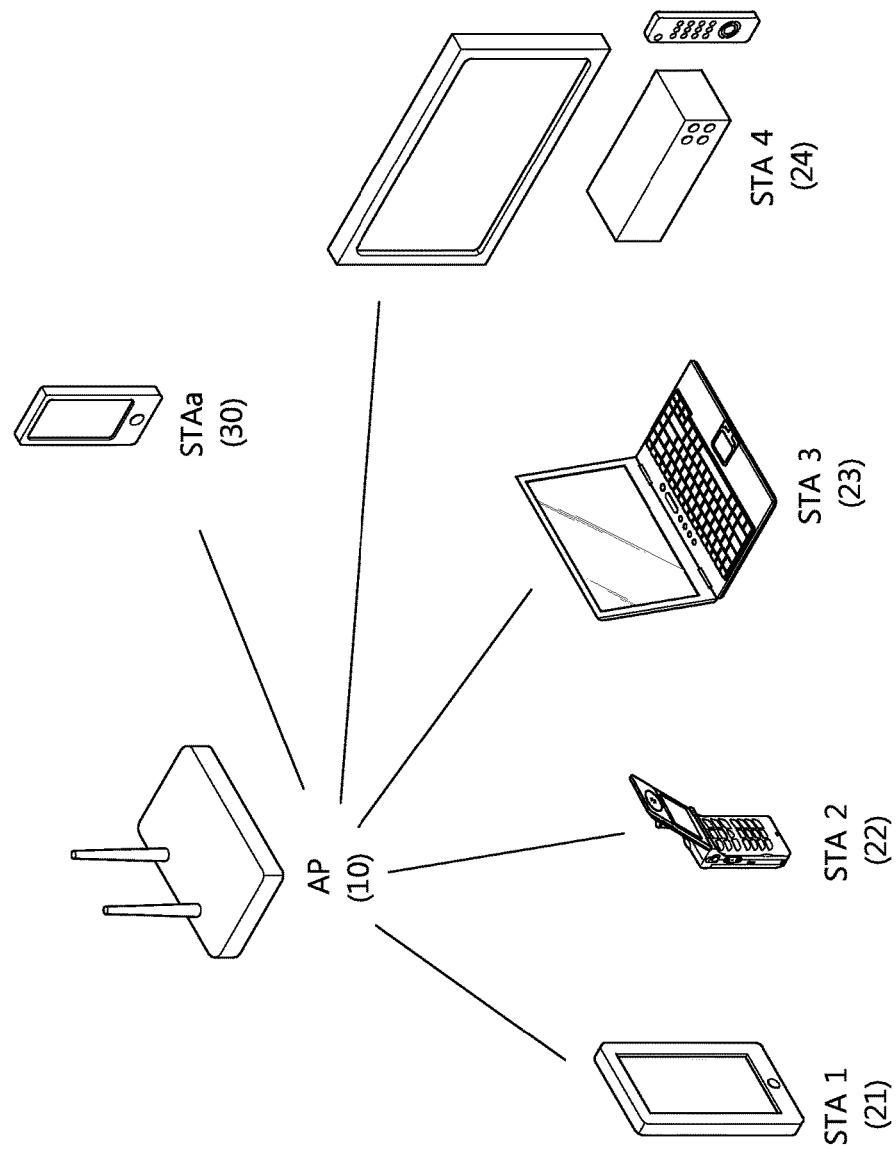
FIG. 1 is a view illustrating the configuration of a general Wireless Local Area Network (WLAN) system to which an embodiment of the present invention may apply.

FIG. 1 is a view illustrating the configuration of a general Wireless Local Area Network (WLAN) system to which an embodiment of the present invention may apply.

Referring to FIG. 1, the WLAN system includes one or more basic service sets (BSSs). A BSS is a set of stations (STAs) that may be successfully synchronized with each other and may communicate with each other, and is not a concept indicating a specific area.

An infrastructure BSS includes one or more non-Access Point (AP) stations (non-AP STA1(21), non-AP STA2(22), non-AP STA3(23), non-AP STA4(24), and non-AP STAa (30)), an AP 10 providing a distribution service, and a distribution system (DS) linking multiple APs. In the infrastructure BSS, the AP manages the non-AP STAs of the BSS.

In contrast, an independent BSS (IBSS) is a BSS operating in an ad-hoc mode. The IBSS does not include an AP and thus lacks a centralized management entity. That is, in the IBSS, non-AP STAs are managed in a distributed manner. In the IBSS, all the STAs may be mobile STAs, and due to no permission to access the DS, constitute a self-contained network.

The STA is any functional entity that includes a medium access control (MAC) and a physical layer interface for a radio medium that follow the Institute of Electrical and Electronics Engineers (IEEE) 802.11 standards and in broader concept includes an AP and a non-AP station.

A non-AP STA is a STA that is not an AP, and may also be referred to as a mobile terminal, wireless device, wireless transmit/receive unit (WTRU), user equipment (UE), mobile station (MS), mobile subscriber unit or simply user. Hereinafter, for ease of description, the non-AP STA is denoted STA.

The AP is a functional entity that provides access to a DS via a radio medium for a STA associated with an AP. In an infrastructure BSS including an AP, communication between STAs is in principle achieved via an AP, but in case a direct link is set up, the STAs may perform direct communication between each other. The AP may also be referred to as a central controller, base station (BS), node-B, BTS (Base Transceiver System), site controller, or managing STA.

A plurality of BSSs including the BSS shown in FIG. 1 may be connected to each other via a distribution system (DS). The plurality of BSSs linked with each other through a DS is referred to as an extended service set (ESS). The APs and/or STAs included in the ESS may communicate with each other, and in the same ESS, STAs may travel from one BSS to another BSS while maintaining seamless communication.

In the WLAN system according to IEEE 802.11, the basic access mechanism of Medium Access Control (MAC) is a Carrier Sense Multiple Access with Collision Avoidance (CSMA/CS) mechanism. The CSMA/CS mechanism is also referred to as Distributed Coordination Function (DCF) of IEEE 802.11 MAC, and basically, it adopts a "listen before talk" access mechanism. Following such type of access mechanism, an AP and/or STA senses a radio channel or medium prior to transmission. If as a result of the sensing, the medium is determined to be in idle state, frame transmission is initiated through the medium. On the contrary, if the medium is sensed to be in occupied state, the AP and/or STA sets a deferred time for medium access and waits without starting its own transmission.

The CSMA/CS mechanism includes virtual carrier sensing in addition to physical carrier sensing in which an AP and/or STA directly senses a medium. The virtual carrier sensing is to make up for a problem that may occur in connection with medium access, such as hidden node problem. In order for virtual carrier sensing, the MAC of the WLAN system makes use of a network allocation vector (NAV). The NAV is a value by which an AP and/or STA currently using a medium or having authority to use the medium informs other AP and/or STA of a time remaining until the medium turns available. Accordingly, the value set by the NAV corresponds to a period during which the use of the medium is scheduled by the AP and/or STA transmitting a frame.

The IEEE 802.11 MAC protocol, together with a DCF, offers a Hybrid Coordination Function (HCF) that is based on a Point Coordination Function (PCF) that periodically performs polling so that all receiving APs and/or STAs may receive data packets in polling-based synchronized access scheme with the DCF. The HCF has an Enhanced Distributed Channel Access (EDCA) that has a contention-based access scheme for providing data packets to multiple users and HCCA (HCF Controlled Channel Access) that uses contention free-based channel access scheme using a polling mechanism. The HCF includes a medium access mechanism for enhancing Quality of Service (QoS) of WLAN and may transmit QoS data in both a contention period (CP) and contention free period (CFP).

In the wireless communication system, a STA cannot be immediately aware of the existence of a network due to the characteristics of the radio medium when a STA powers on and starts operating. Accordingly, in order to access a network, a STA, whatever type it is, should go through a network discovery process. When discovering a network through the network discovery process, the STA selects a network to subscribe to through a network selection process. Thereafter, the STA subscribes to the selected network and performs data exchange at a transmission end/reception end.

In the WLAN system, the network discovery process is implemented as a scanning procedure. The scanning procedure is separated into passive scanning and active scanning. The passive scanning is achieved based on a beacon frame that is periodically broadcast by an AP. In general, an AP in the WLAN system broadcasts a beacon frame at a specific interval (for example, 100 msec). The beacon frame includes information on a BSS managed by it. The STA passively awaits reception of the beacon frame at a specific channel. When obtaining the information on the network by receiving the beacon frame, the STA terminates the scanning procedure at the specific channel. The STA need not transmit a separate frame in achieving passive scanning, and the passive scanning is rather done once the beacon frame is received. Accordingly, the passive scanning may reduce the overall overhead. However, it suffers from a scanning time that is increased in proportion to the transmission period of the beacon frame.

The active scanning is that the STA actively broadcasts a probe request frame at a specific channel to request that all the APs to receive the probe request frame send network information to the STA. When receiving the probe request frame, an AP waits for a random time so as to prevent frame collision, and then includes network information in a probe response frame, then transmits the probe response frame to the STA. The STA receives the probe response frame to thereby obtain the network information, and the scanning procedure is then ended. The active scanning may get scanning done relatively quickly, but may increase the overall network overhead due to the need of a frame sequence that comes from request-response.

When finishing the scanning procedure, the STA selects a network per a specific standard on itself and then performs an authentication procedure alongside the AP. The authentication procedure is achieved in 2-way handshake. When completing the authentication procedure, the STA proceeds with an association procedure together with the AP.

The association procedure is performed in two-way handshake. First, the STA sends an association request frame to the AP. The association request frame includes information on the STA's capabilities. Based on the information, the AP determines whether to allow association with the STA. When determining whether to allow association, the AP transmits an association response frame to the STA. The association response frame includes information indicating whether to allow association and information indicating the reason for association being allowed or failing. The association response frame further includes information on capabilities supportable by the AP. In case association is successfully done, normal frame exchange is done between the AP and STA. In case association fails, the association procedure is retried based on the information on the reason for the failure included in the association response frame or the STA may send a request for association to other AP.

In order to overcome limit to speed that is considered to be a weakness in WLAN, IEEE 802.11n has been established relatively in recent years. IEEE 802.11n aims to increase network speed and reliability while expanding wireless network coverage. More specifically, IEEE 802.11n supports high throughput (HT) that reaches data processing speed up to 540 Mbps and is based on MIMO (Multiple Inputs and Multiple Outputs) technology that adopts multiple antennas at both transmission end and reception end in order to optimize data speed and minimize transmission errors.

As WLAN spreads and more diversified applications using WLAN show up, a need for a new WLAN system arises for supporting a higher throughput than the data processing speed supported by IEEE 802.11n. The WLAN system supporting very high throughput (VHT) is a subsequent version of the IEEE 802.11n WLAN system, which is a new one recently suggested to support a throughput more than 500 Mbps for a single user and data processing speed more than 1 Gpbs for multiple users in an MAC service access point (SAP).

Advancing further than the existing WLAN system supporting 20 MHz or 40 MHz, the VHT WLAN system intends to support 80 MHz, contiguous 160 MHz, non-contiguous 160 MHz band transmission and/or more bandwidth transmission. Further, the VHT WLAN system supports 250 Quadrature Amplitude Modulation (QAM) that is more than a maximum of 64QAM of the existing WLAN system.

Since the VHT WLAN system supports a Multi User-Multiple Input Multiple Output (MU-MIMO) transmission method for higher throughput, the AP may transmit a data frame simultaneously to at least one or more MIMO-paired STAs. The number of paired STAs may be maximally 4, and when the maximum number of spatial streams is eight, each STA may be assigned up to four spatial streams.

Referring back to FIG. 1, in the WLAN system shown in the figure, the AP 10 may simultaneously transmit data to a STA group including at least one or more STAs among a plurality of STAs 21, 22, 23, 24, and 30 associated with the AP 10. In FIG. 1, by way of example, the AP conducts MU-MIMO transmission to the STAs. However, in a WLAN system supporting Tunneled Direct Link Setup (TDLS) or Direct Link Setup (DLS) or mesh network, a STA to transmit data may send a Physical Layer Convergence Procedure (PLCP) Protocol Data Unit (PPDU) to a plurality of STAs using an MU-MIMO transmission scheme. Hereinafter, an example where an AP transmits a PPDU to a plurality of STAs according to an MU-MIMO transmission scheme is described.

Data may be transmitted through different spatial streams to each STA. The data packet transmitted by the AP 10 may be referred to as a PPDU, which is generated at the physical layer of the WLAN system and transmitted, or a frame as a data field included in the PPDU. That is, the PPDU for Single User-Multiple Input Multiple Output (SU-MIMO) and/or MU-MIMO or data field included in the PPDU may be called a MIMO packet. Among them, the PPDU for MUs may be called an MU packet. In the example of the present invention, assume that a transmission target STA group MU-MIMO-paired with the AP 10 includes STA1 21, STA2 22, STA3 23, and STA4 24. At this time, no spatial stream is assigned to a specific STA in the transmission target STA group, so that no data may be transmitted to the specific STA. Meanwhile, assume that STAa 30 is associated with the AP but is not included in the transmission target STA group.

In the WLAN system, an identifier may be assigned to the transmission target STA group in order to support MU-MIMO transmission, and this identifier is denoted group ID. The AP sends a group ID management frame including group definition information for allocating group IDs to the STAs supporting MU-MIMO transmission and accordingly the group IDs are assigned to the STAs before PPDU transmission. One STA may be assigned a plurality of group IDs.

Table 1 below represents information elements included in the group ID management frame.

TABLE 1

| Order | Information |
|---|---|
| 1 | Category |
| 2 | VHT action |
| 3 | Membership status |
| 4 | Spatial stream position |

The category field and VHT action field are configured so that the frame corresponds to a management frame and to be able to identify being a group ID management frame used in a next-generation WLAN system supporting MU-MIMO.

As in Table 1, the group definition information includes membership status information indicating whether to belong to a specific group ID, and in case of belonging to the group ID, information indicating the number of position to which the spatial stream set of the STA corresponds in all the spatial streams according to MU-MIMO transmission.

Since one AP manages a plurality of group IDs, the membership status information provided to one STA needs to indicate whether the STA belongs to each of the group IDs managed by the AP. Accordingly, the membership status information may be provided in the form of an array of subfields indicating whether it belongs to each group ID. The spatial stream position information indicates the position of each group ID, and thus, may be provided in the form of an array of subfields indicating the position of a spatial stream set occupied by the STA with respect to each group ID. Further, the membership status information and spatial stream position information for one group ID may be implemented in one subfield.

The AP, in case of sending a PPDU to a plurality of STAs through an MU-MIMO transmission scheme, transmits the PPDU, with information indicating a group identifier (group ID) in the PPDU as control information. When receiving the PPDU, a STA verifies whether it is a member STA of the transmission target STA group by checking the group ID field. If the STA is a member of the transmission target STA group, the STA may identify what number of position where the spatial stream set transmitted to the STA is located in the entire spatial stream. The PPDU includes information on the number of spatial streams allocated to the receiving STA, and thus, the STA may receive data by discovering the spatial streams assigned thereto.

Meanwhile, TV WS (White Space) draws attention as a newly available frequency band in the WLAN system. TV WS refers to an unused frequency band that is left as the analog TV broadcast is digitalized in the U.S. For example, TV WS includes a 54 to 598 MHz band. However, this is merely an example, and TV WS may be a permitted band that may be first used by a licensed user. The licensed user means a user that is permitted for use of a permitted band, and may also be referred to as a licensed device, primary user, or incumbent user.

The AP and/or STA operating in the TV WS should offer a protection function as to a licensed user, and this is because a licensed user has priority as to use of a TV WS band. For instance, in case a licensed user such as a microphone is already using a specific WS channel that is a frequency band split per protocol to have a certain bandwidth in the TV WS band, the AP and/or STA cannot use the frequency band corresponding to the WS channel in order to protect the licensed user. Further, the AP and/or STA should stop use of the frequency band if the licensed user happens to use the frequency band that is being used for transmission and/or reception of a current frame.

Accordingly, the AP and/or STA should first grasp whether a specific frequency band in the TV WS band is available, in other words, whether there is a licensed user in the frequency band. Grasping whether there is a licensed user in the specific frequency band is denoted spectrum sensing. As a spectrum sensing mechanism, an energy detection scheme or signature detection scheme may be utilized. If the strength of a received signal is higher than a predetermined value, it is determined that it is being used by a licensed user, or if a DTV preamble is detected, it may be determined to be being used by a licensed user.

Always sensing a channel for frame transmission and reception causes the STA to continue to consume power. The power consumption in the reception state makes little difference as compared with the power consumption in the transmission state, so that keeping the reception state causes the STA battery powered to consume relatively more power. Accordingly, when in the WLAN system a STA conducts channel sensing while continuously maintaining the reception waiting state, inefficient power consumption may arise without particularly increasing WLAN throughput, and thus, it is inappropriate in view of power management.

To compensate for such problems, the WLAN system supports a power management (PM) mode for a STA. The STA power management mode is separated into an active mode and a power save (PS) mode. The STA operates basically in the active mode. The STA operating in the active mode maintains an awake state. That is, the STA remains at a state of being able to perform normal operation such as frame transmission and reception or channel sensing.

When in normal operation, the STA shifts between the doze state and awake state. In the doze state, the STA operating with the minimum power and does not receive radio signals including data frames from the AP. Further, in the doze state, the STA does not conduct channel sensing.

As the STA operates as long as possible, power consumption decreases, so that the operation period of the STA is increased. However, since frame transmission and reception is impossible in the doze state, it cannot be left at the operation state unconditionally. In case there is a frame to be transmitted from the STA operating in the doze to the AP, the STA shifts to the awake state, thereby able to receive frames. However, in case the AP has a frame to be transmitted to the STA operating in the doze state, the STA cannot receive the frame nor is the STA able to be aware of the existence of the STA. Accordingly, the STA may require the operations of being aware of whether there is a frame to be sent to the STA, and if any, shifting to the awake state at a specific period so as to receive the frame. This is described below in connection with FIG. 2.

Figure 2:
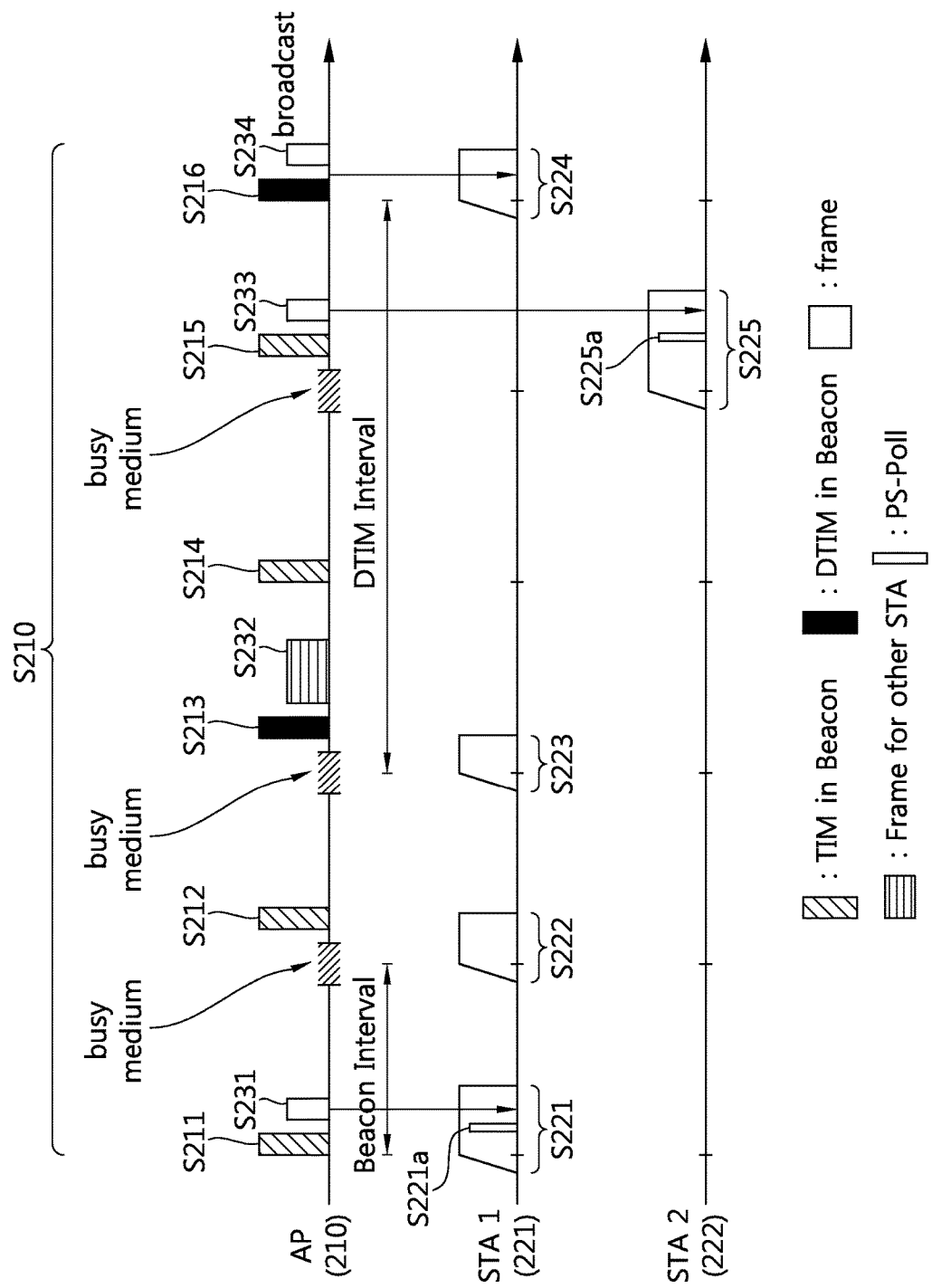
FIG. 2 is a view illustrating an example of power management operation.

FIG. 2 is a view illustrating an example of power management operation.

Referring to FIG. 2, the AP 210 sends a beacon frame to STAs in a BSS at a constant period (S210). The beacon frame includes a Traffic Indication Map (TIM) information element. The TIM element includes information indicating that the AP 210 buffers a bufferable frame (or bufferable unit; BU) for the STAs associated with the AP 210 and that the frame is to be sent. The TIM element includes a TIM used to indicate a unicast frame and a Delivery Traffic Indication Map (DTIM) used to indicate a multicast or broadcast frame.

The AP 210 transmits a DTIM once every three beacon frames of transmission. STA1 221 and STA2 222 are STAs operating in PS mode. STA1 221 and STA2 222 shift from the doze state to the awake state at every wakeup interval of a specific period so that the STAs may receive the TIM element transmitted from the AP 210.

A specific wakeup interval may be configured so that STA1 221 may shift to the awake state at every beacon interval to thus receive a TIM element. Accordingly, when the AP 210 first sends out a beacon frame (S211), STA1 221 switches to the awake state (S221). STA1 221 receives the beacon frame and obtains the TIM element. In case the obtained TIM element indicates that a bufferable frame to be sent to STA1 221 is being buffered, STA1 221 transmits a PS-poll frame to the AP 210 to request that the AP 210 send a frame (S221a). In response to the PS-poll frame, the AP 210 sends a frame to STA1 221 (S231). When completely receiving the frame, STA1 221 turns back to the doze state.

When the AP 210 sends out a second beacon frame, since the medium is occupied, for example, as if another device gains access to the medium, the AP 210 fails to send a beacon frame at exact beacon interval and may deferred transmission of the beacon frame (S212). In such case, STA1 221 turns its operation mode to the awake state according to the beacon interval, but cannot receive the deferred beacon frame, so that STA1 221 switches back to the doze state (S222).

When the AP 210 sends out a third beacon frame, the beacon frame may include a TIM element that is set as DTIM. However, since the medium is occupied, the AP 210's transmission of the beacon frame is deferred (S213). STA1 221 switches to the awake state in accordance with the beacon interval and may obtain the DTIM through the beacon frame transmitted by the AP 210. The DTIM obtained by STA1 221 indicates that there is no frame to be transmitted to STA1 221 and that there is a frame for other STA. Accordingly, STA1 221 shifts back to the doze state. The AP 210, after transmission of the beacon frame, sends a frame to the STA (S232).

The AP 210 sends a fourth beacon frame (S214). However, STA1 221 could not obtain the information indicating that a bufferable frame for itself remains buffered through the previous twice reception of the TIM element, and thus, STA1 221 may adjust the wakeup interval for reception of a TIM element. Or, in case the beacon frame transmitted by the AP 210 includes signaling information for adjusting the wakeup interval value of STA1 221, the wakeup interval value of STA1 221 may be adjusted. In this example, STA1 221 may change its configuration so that shift of the operation state for receiving a TIM element is performed at every three beacon intervals rather than at every beacon interval. Accordingly, STA1 221 stays at the doze state after the AP 210 sends a fourth beacon frame (S214) and when the AP 210 transmits a fifth beacon frame (S215), and thus, it cannot obtain the TIM element.

When the AP 210 sends out a sixth beacon frame (S216), STA1 221 switches to the awake state and obtains the TIM element included in the beacon frame (S224). The TIM element is a DTIM indicating that there is a broadcast frame, so that STA1 221 does not transmit a PS-poll frame to the AP 210 and receives a broadcast frame transmitted by the AP 210 (S234).

Meanwhile, the wakeup interval configured in STA2 222 may have a longer period than that of STA1 221. Accordingly, when the AP 210 sends a fifth beacon frame (S215), STA2 222 may switch to the awake state to receive a TIM element (S225). STA2 222 is aware that there is a frame to be sent thereto through the TIM element, and in order to request transmission, sends a PS-poll frame to the AP 210 (S225a). The AP 210 sends a frame to STA2 222 in response to the PS-poll frame (S233).

In order to operate the power save mode as shown in FIG. 2, the TIM element includes a TIM indicating whether there is a frame to be sent to the STA or a DTIM indicating whether there is a broadcast/multicast frame. The DTIM may be embodied by configuring a field of the TIM element.

Figure 3:
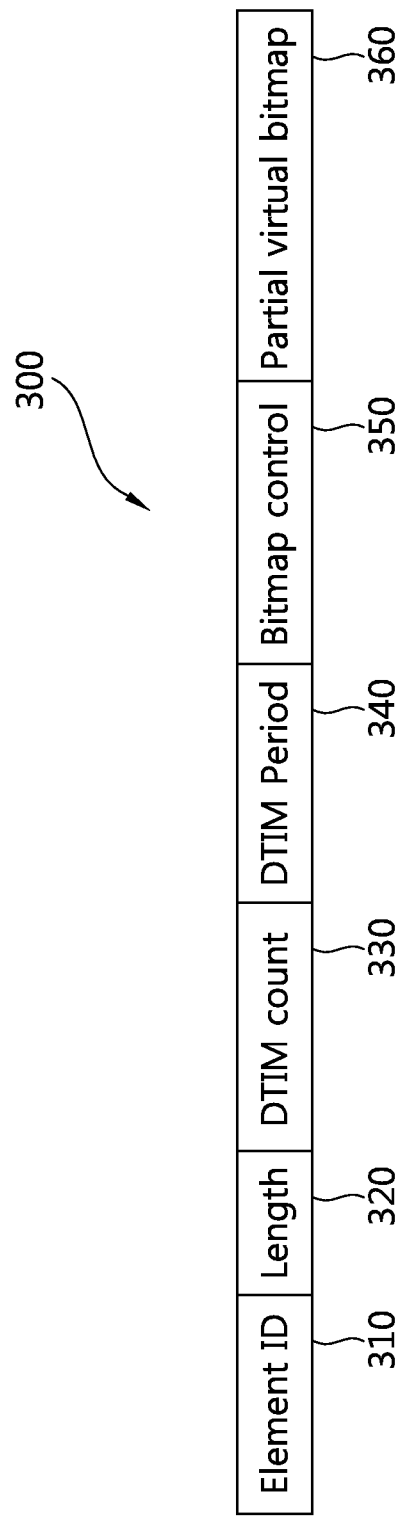
FIG. 3 is a block diagram illustrating an example of a TIM element format.

FIG. 3 is a block diagram illustrating an example of a TIM element format.

Referring to FIG. 3, the TIM element 300 includes an element ID field 310, a length field 320, a DTIM count field 330, a DTIM period field 340, a bitmap control field 350, and a partial virtual bitmap field 360.

The element ID field 310 indicates that an information element is a TIM element. The length field 320 indicates the whole length including itself and subsequent fields. The maximum value may be 255 and may be set in octets.

The DTIM count field 330 indicates whether a current TIM element is a DTIM, and unless it is a DTIM, indicates the number of remaining TIMs until the DTIM is transmitted. The DTIM period field 340 indicates a period at which the DTIM is transmitted, and the period at which the DTIM is transmitted may be set as a multiple of the count of transmission of a beacon frame.

The bitmap control field 350 and the partial virtual bitmap field 360 indicate whether a bufferable frame is buffered for a specific STA. The first bit in the bitmap control field 350 indicates whether there is a multicast/broadcast frame to be sent. The remaining bits are set to indicate an offset value to interpret the subsequent partial virtual bitmap field 360.

The partial virtual bitmap field 360 is set as a value indicating whether there is a bufferable frame to be sent to each STA. This may be set in the bitmap form where a bitmap corresponding to the AID value of a specific STA is set as 1. According to the AID order, allocation may be done from 1 to 2007, and as an example, if the fourth bit is set as 1, it means that traffic is buffered in the AP which is to be sent to the STA whose AID is 4.

Meanwhile, in the circumstance where bits set as consecutive 0's come up frequently in configuring the bit sequence of the partial virtual bitmap field 360, using the whole bit sequence configuring the bitmap may be insufficient. For this, the bitmap control field 350 may contain offset information for the partial virtual bitmap field 360.

Figure 4:
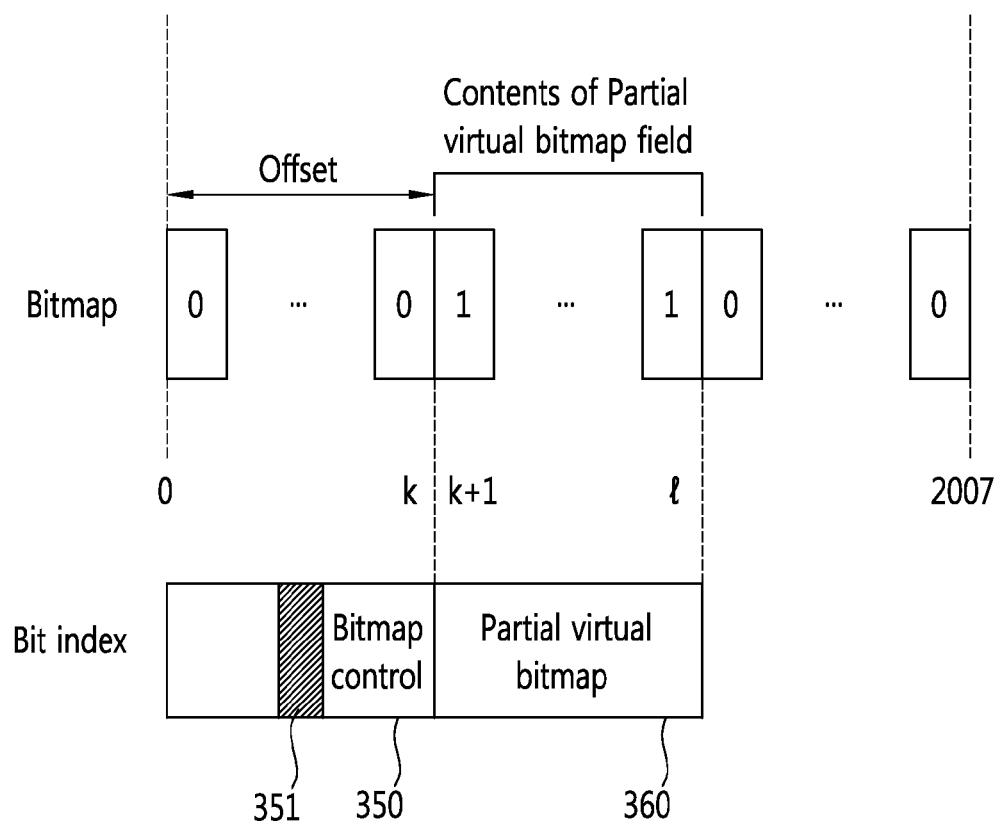
FIG. 4 is a view illustrating an example of a bitmap control field and a partial virtual bitmap field according to an embodiment of the present invention.

FIG. 4 is a view illustrating an example of a bitmap control field and a partial virtual bitmap field according to an embodiment of the present invention.

Referring to FIG. 4, the bitmap sequence constituting the partial virtual bitmap field 360 indicates whether the STA having an AID corresponding to the bitmap index includes a buffered frame. The bitmap sequence constitutes indication information on AIDs 0 to 2007.

The bitmap sequence may have consecutive 0's from the first bit to the kth bit. Further, consecutive 0's may be set from the other 1th bit to the last bit. This indicates that the STAs assigned AIDs 0 to k and the STAs assigned with 1 to 2007 do not have any buffered frame. As such, the sequence of consecutive 0's from $0^{th}$ to the kth in the early part of the bitmap sequence may be provided offset information and the sequence of 0's in the latter part may be omitted, thereby reducing the size of the TIM element.

For this, the bitmap control field 350 may include a bitmap offset subfield 351 that contains offset information of a sequence of consecutive 0's in the bitmap sequence. The bitmap offset subfield 351 may be set to indicate k, and the partial virtual bitmap field 360 may be set to include the k+1th bit to the 1-1th bit of the original bitmap sequence.

A detailed responding procedure of the STA that has received the TIM element is described with reference to FIGS. 5 to 7.

Figure 5:
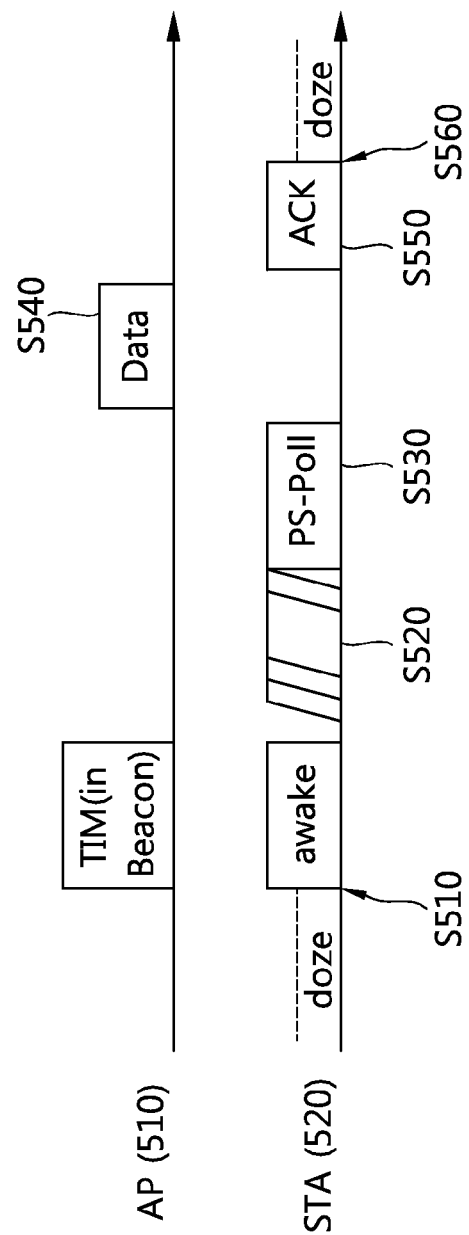
FIG. 5 is a flowchart illustrating an example of an AP's responding procedure in a TIM protocol.

FIG. 5 is a flowchart illustrating an example of an AP's responding procedure in a TIM protocol.

Referring to FIG. 5, the STA 520 shifts its operation state from doze state to awake state in order to receive a beacon frame including a TIM from the AP 510 (S510). The STA 520 may be aware that there is a buffered frame to be sent thereto by interpreting the received TIM element.

The STA 520 contends with other STAs for medium access to transmit a PS-poll frame (S520) and sends a PS-poll frame to the AP 510 for requesting transmission of a data frame (S530).

When receiving the PS-poll frame transmitted from the STA 520, the AP 510 sends a frame to the STA 520 (S540). The STA 520 receives the data frame and in response transmits an ACK (acknowledgement) frame to the AP 510 (S550). Thereafter, the STA 520 shifts its operating mode back into the doze state (S560).

The AP may transmit data at a specific time after receiving the PS-poll frame rather than sending a data frame right after receiving the PS-poll frame from the STA as shown in FIG. 5.

Figure 6:
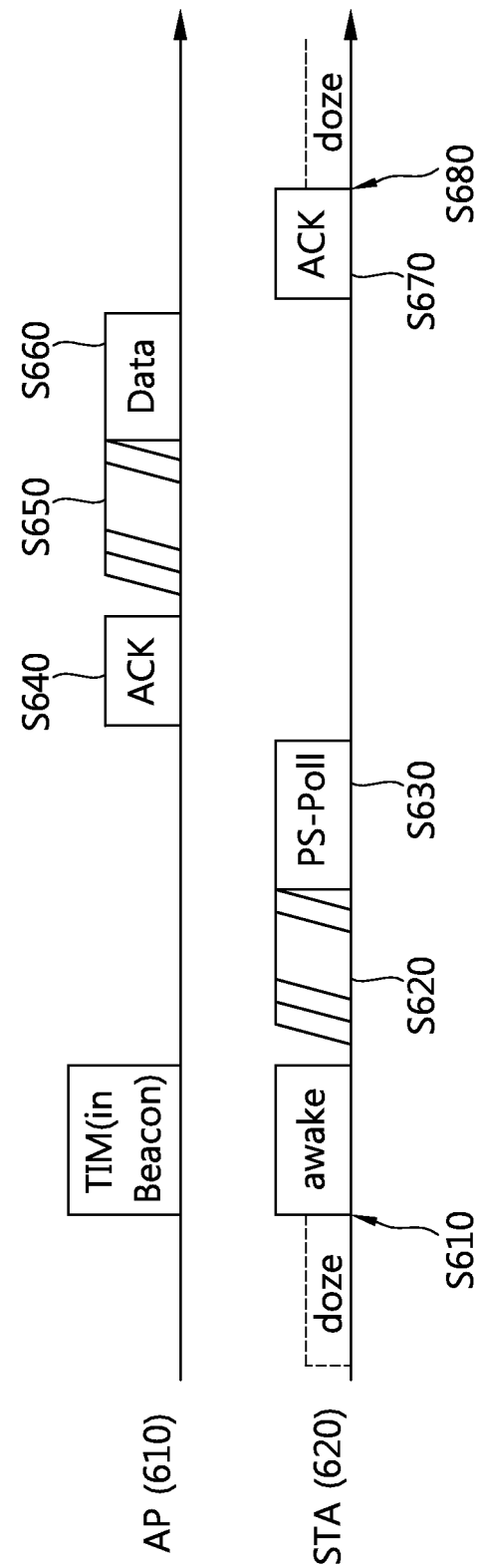
FIG. 6 is a flowchart illustrating another example of an AP's responding procedure in a TIM protocol.

FIG. 6 is a flowchart illustrating another example of an AP's responding procedure in a TIM protocol.

Referring to FIG. 6, the STA 620 shifts its operation mode from doze state to awake state in order to receive a beacon frame including a TIM from the AP 610 (S610). The STA 620 may be aware that there is a buffered frame to be sent thereto by interpreting the received TIM element.

The STA 620 contends with other STAs for medium access for transmission of the PS-poll frame (S620) and sends the PS-poll frame to the AP 610 for requesting the transmission of a data frame (S630).

In case, despite receiving the PS-poll frame, the AP 610 fails to prepare for a data frame for a specific time interval, the AP 610, instead of immediately transmitting a data frame, sends an ACK frame to the STA 620 (S640). This is a feature of a deferred response different from step S540 in which the AP 510 shown in FIG. 5 sends a data frame to the STA 520 immediately in response to the PS-poll frame.

The AP 610, if a data frame is ready after transmission of the ACK frame, performs contention (S650), and then sends a data frame to the STA 620 (S660).

The STA 620 sends an ACK frame to the AP 610 in response to reception of the data frame (S670) and switches its operation mode to the doze state (S680).

If the AP sends a DTIM to the STA, a TIM protocol procedure that is performed thereafter may differ.

Figure 7:
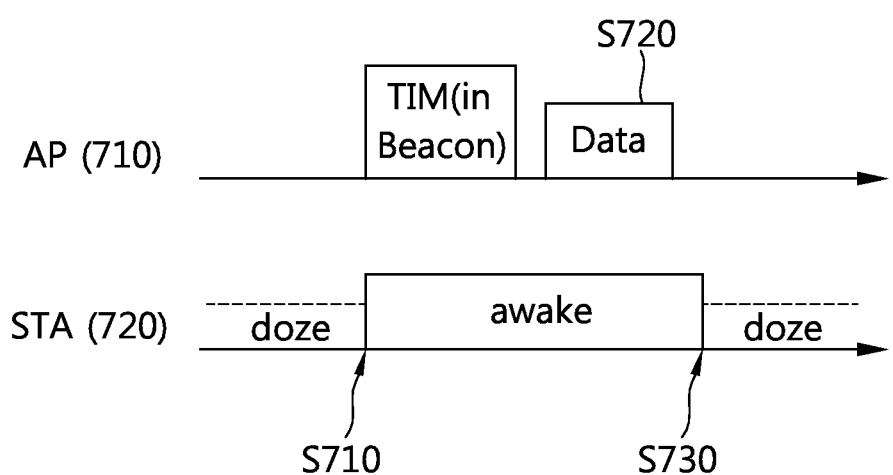
FIG. 7 is a flowchart illustrating a procedure of a TIM protocol by a DTIM.

FIG. 7 is a flowchart illustrating a procedure of a TIM protocol by a DTIM.

Referring to FIG. 7, STAs 720 switch their operation mode from the doze state to the awake state in order to receive a beacon frame including a TIM element (S710). The STAs 720 may be aware that a multicast/broadcast frame is to be transmitted through the received DTIM.

The AP 710 sends out a multicast/broadcast frame after transmission of the beacon frame including the DTIM (S720). The STAs 720 switch their operation state back to the doze state after receiving the multicast/broadcast frame transmitted by the AP 710.

In the power save mode operation method based on the TIM protocol described in connection with FIGS. 2 to 7, the STAs may verify whether there is a buffered frame to be transmitted due to buffered traffic through the STA identification information included in the TIM element. The STA identification information may be information associated with an Association Identifier (AID) that is an identifier assigned when the STA is associated with the AP. The STA identification information may be configured to directly indicate the AIDs of the STAs having a buffered frame or may be configured in the bitmap type in which a bit order corresponding to the AID value is set as a specific value. The STAs may be aware that there is a frame buffered thereto if the STA identification information indicates its AID.

Meanwhile, a power management operation based on Automatic Power Save Delivery (APSD) may also be offered in order for saving power of a station.

The AP that may support APSD signals that the APSD may be supported through use of the APSD subfield included in the capabilities information field of the association response frame, probe response frame, and beacon frame. The STA that may support APSD uses a power management field that is included in the frame control field of the frame in order to indicate whether it operates in the active mode or power save mode.

The APSD is a mechanism for delivering downlink data and a bufferable management frame to a STA that is operating in the power save mode. In the frame that is transmitted by the STA that stays in the power save mode and is using APSD, the power management bit of the frame control field is set as 1, and through this, buffering may arise in the AP.

The APSD defines two delivery mechanisms such as Unscheduled-APSD (U-APSD) and Scheduled-APSD (S-APSD). The STA may use the U-APSD so that part or whole of its Bufferable Unit (BU) is delivered during an unscheduled Service Period (SP). The STA may use the S-APSD so that part or whole of its BU is delivered during a scheduled SP.

The STA using the U-APSD might not receive a frame transmitted by the AP during a service period due to interference. Although the AP might not sense interference, the AP may determine that the STA failed to exactly receive the frame. The U-APSD co-existence capability value enables the STA to inform requested transmission duration to the AP so that it can be used as a service period for the U-APSD. The AP may transmit a frame during the service period, and accordingly, may enhance the possibility of being able to receive a frame while the STA is under interference. Further, the U-APSD may reduce possibility of failing to receive a frame transmitted from the AP during the service period.

The STA transmits to the AP an Add Traffic Stream (ADDTS) request frame including a U-APSD coexistence element. The U-APSD coexistence element may include information on the requested service period.

The AP treats the requested service period, and in response to the ADDTS request frame, may send an ADDTS response frame. The ADDTS request frame may include a state code. The state code may indicate response information on the requested service period. The state code may indicate whether the requested service period is allowed, and in case the requested service period is refused, may further indicate a reason for the refusal.

In case the requested service period is allowed by the AP, the AP may send a frame to the STA during the service period. The duration of the service period may be specified by the U-APSD coexistence element included in the ADDTS request frame. The start of the service period may be a time when the AP normally receives a trigger frame transmitted from the STA.

The STA may enter into the doze state if the U-APSD service period expires.

Meanwhile, as various communication services such as smart grid and e-Health, or ubiquitous services appear, the Machine to Machine (M2M) to support such services draws attention. A sensor for sensing temperature or moisture, a camera, a home appliance such as a TV, or a bulky machine including a factory processing machine or a vehicle may be one element of an M2M system. Elements constituting an M2M system may transmit and receive data based on WLAN communication. In case devices of an M2M system supports WLAN and configure a network, the system is hereinafter referred to as an M2M WLAN system.

An M2M-supportive WLAN system may make use of a frequency band of 1 GHz or more, and use of a low band frequency may cause the service coverage to be expanded. Accordingly, the number of wireless devices located in the service coverage may be larger than the number of wireless devices in the existing WLAN system. Further, the M2M-supportive WLAN system has the following features.

1) Large number of stations: Unlike an existing network, M2M is on the basis of an assumption that a large number of STAs exist within a BSS. This is because, sensors, or the like, installed in houses, companies, and the like, are all considered. Thus, a considerably large number of STAs may be connected to a single AP.

2) Low traffic load per STA: Since an STA has a traffic pattern of collecting and reporting surrounding information, information is not required to be frequently sent and an amount of information is small.

3) Uplink-centered communication: M2M has a structure in which a command is mainly received by downlink, an action is taken, and result data is reported to uplink. Primary data is generally transmitted in uplink, so in a system supporting M2M, uplink is the core.

4) Power management of STA: An M2M terminal largely operates with a battery, so it is difficult for a user to frequently charge it in many cases. Thus, a power management method for minimizing battery consumption is required.

5) Automatic recovery function: it is difficult for a user to directly manipulate a device constituting an M2M system in a particular situation, so the device is required to have a self-recovery function.

In accordance with a server/client structure in a general WLAN system, a client such as STA sends a request for information to a server, and the server sends information to the STA in response to the request. At the time, the server that has provided information may be considered a machine that mechanically collects and offers information, and an entity that has received the information may be a user using the client. Due to such structural nature, downlink-oriented communication technology has been mainly developed in the existing WLAN systems.

On the contrary, in the M2M-supportive WLAN system, an opposite of the above structure applies. In other words, the client, a machine, gathers and provides information, and the user managing the server may request information. That is, in the M2M-supportive WLAN system, the M2M server issues a command related to ambient environment measurement to M2M STAs and the M2M STAs conduct operation per the command and report the collected information to the server, in general communication flow. Unlike the previous, the user happens to access the network in the side of the server, and the communication flow goes in the opposite direction. These are structural features of the M2M-supportive WLAN system.

In the above WLAN environment, a power save mechanism may be offered which prevents the STA from unnecessarily maintaining the awake state, and if identified that there is a buffered frame, enables the STA to switch to the awake state in order to receive the buffered frame.

The STA transmitting and receiving a frame based on the power save mechanism may be conducted based on the TIM protocol as shown in FIGS. 2 to 7. According to the TIM protocol, the AP sends a data frame after receiving a PS-poll frame from the STA, and in this case, the AP may transmit one buffered frame, i.e., a PSDU, in response to the PS-poll frame. Meanwhile, in the environment where there are many buffered traffics for the STA, it is not efficient in view of traffic treatment that the AP transmitting only one buffered frame in response to the PS-poll frame.

To address the above problems, a U-APSD may apply to a method of transmitting and receiving a frame based on a TIM protocol. The STA may receive at least one or more frames from the AP during a service period for itself.

Figure 8:
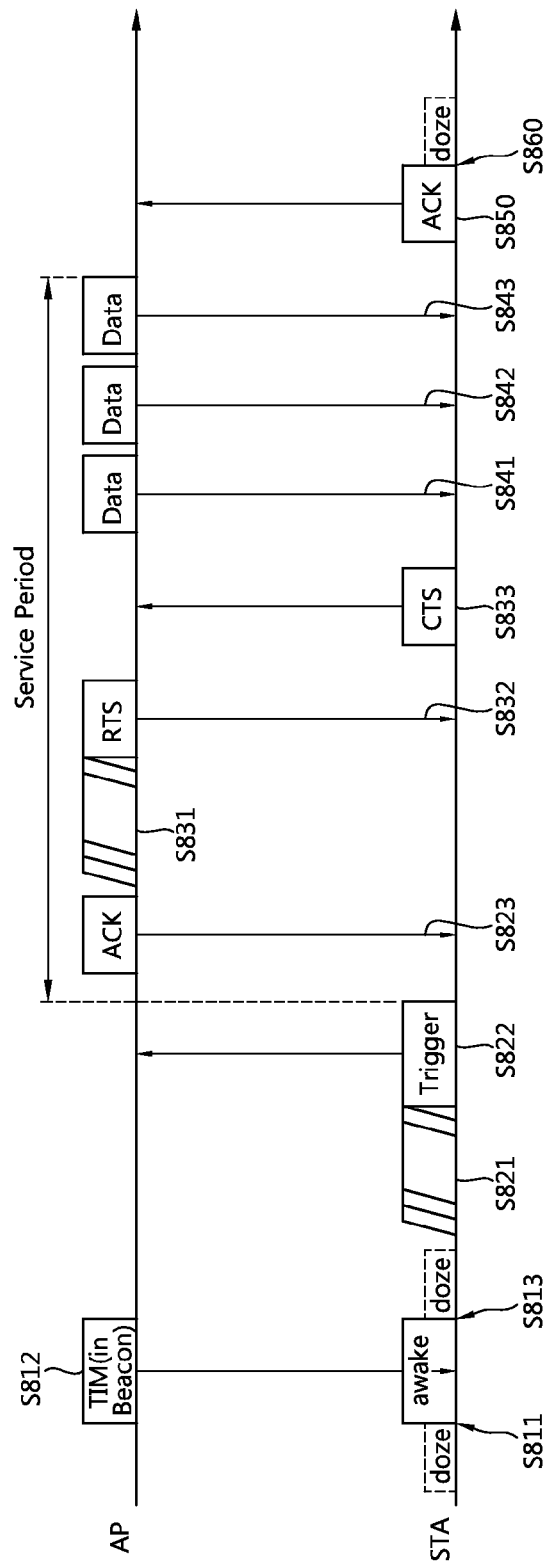
FIG. 8 is a view illustrating an example method of transmitting and receiving a frame based on a TIM protocol and U-APSD.

FIG. 8 is a view illustrating an example method of transmitting and receiving a frame based on a TIM protocol and U-APSD.

Referring to FIG. 8, the STA, which stays in the doze state, enters into the awake state in order to receive a TIM element (S811).

The STA receives a TIM element (S812). The TIM element may be transmitted, included in a beacon frame. When receiving the TIM element, the STA may determine whether a bufferable frame for itself is being buffered based on the AID of the STA and the bitmap sequence of the partial virtual bitmap field included in the TIM element.

When identifying that there is a buffered frame, the STA enters back into the doze state (S813).

At a time when the buffered frame desires to be transmitted, the STA switches back to the awake state and obtains a channel access authority through contention (S821). The STA acquires the channel access authority and transmits a trigger frame to thereby notify that a service period for the STA has been initiated (S822).

The AP sends an ACK frame to the STA in response to the trigger frame (S823).

The AP may conduct an RTS/CTS exchange procedure to transmit a buffered frame within a service period. The AP obtains a channel access authority through contention in order to send an RTS frame (S831). The AP transmits an RTS frame to the STA (S832), and the STA sends a CTS frame to the AP in response thereto (S833).

The AP transmits a data frame related to at least a buffered frame after RTS/CTS exchange at least once or more (S841, S842, and S843). If the AP conducts the last transmission of a frame with End Of Service Period (EOSP) in the QoS service field set as '1,' the STA may then receive the last frame and may recognize that the service period is to be terminated.

The STA sends an ACK frame to the AP in response to the, at least, one frame received when the service period is terminated (S850). At the time, the ACK frame may be a block ACK, an acknowledgement of reception for a plurality of frames. The STA that has transmitted the ACK frame enters into the doze state (S860).

By the frame transmission/reception method described above in connection with FIG. 8, the STA may begin the service period at a desired time and may receive at least one or more frames during one service period. Accordingly, efficiency may be enhanced in light of traffic processing.

Meanwhile, in the above-described frame transmission/reception method, the RTS/CTS frame exchange required upon transmission of data in order to prevent a hidden node problem puts heavy overhead on data transmission. Further, in relation to the U-APSD, it takes a while after the STA sends a trigger frame to request that the AP send data and the AP then prepares for data to be sent and subsequently conducts contention for data transmission. Since the STA may happen to unnecessarily maintain the awake state for the time, the power save efficiency may be lowered.

Accordingly, the present invention suggests a method of being able to more efficiently transmit a data frame that is prepared for transmission to the STA by the AP in advance starting a service period at a scheduled time between the AP and the STA when the STA receives data from the AP.

For this the present invention suggests an Service Period (SP)-poll frame.

Figure 9:
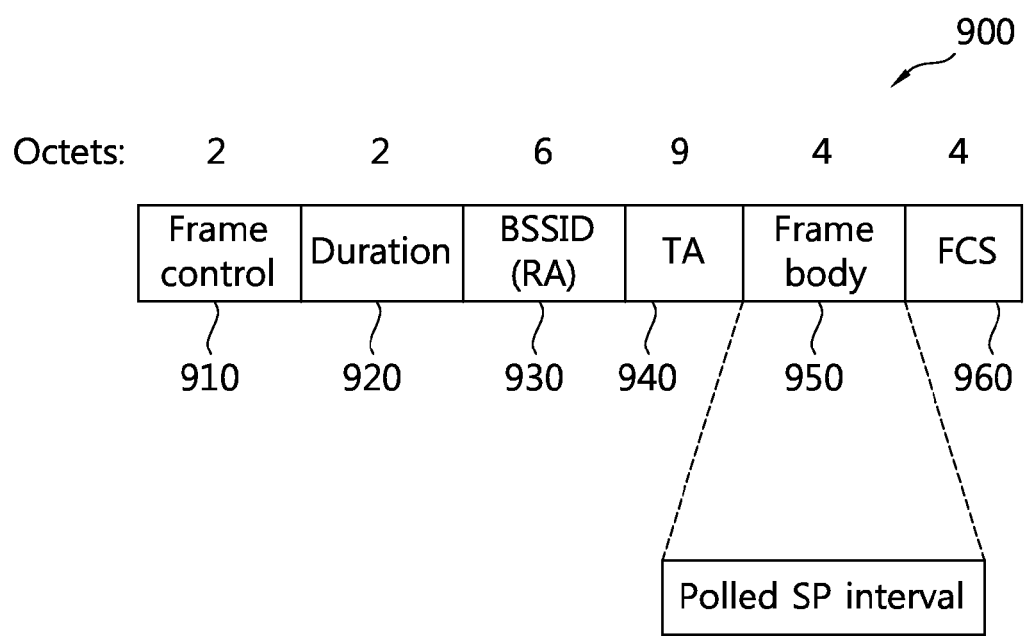
FIG. 9 is a block diagram illustrating an MAC frame format of an SP-poll frame according to an embodiment of the present invention.

FIG. 9 is a block diagram illustrating an MAC frame format of an SP-poll frame according to an embodiment of the present invention.

Referring to FIG. 9, the SP-poll frame 900 may include a frame control field 910, a duration field 920, a BSSID(RA) field 930, a TA field 940, a frame body 950, and an FCS field 960.

The frame control field 910 may indicate that the frame is a SP-poll frame.

The duration field 920 may indicate duration of a polled service period initiated by the SP-poll frame 900. The duration field 920 may be a basis for configuring an NAV (Network Allocation Vector) of other STA that does not send the SP-poll frame 900.

The BSSID(RA) field 930 may include identification information of the AP or identification information of the BSS operated by the AP associated with the STA. The identification information may be a BSSID.

The TA field 940 may include identification information of the STA that has transmitted the SP-poll frame 900. The identification information may be the MAC address of the STA. The identification information may include an AID of the STA.

The frame body 950 may include a polled SP interval field. The polled SP interval field may include information related to the polled SP interval that is an interval between when the service period initiated by the SP-poll frame 900 expires and when a subsequent service period is initiated. The polled SP interval field may include information related to a time when the SP-poll frame 900 is transmitted and then a next SP-poll frame is transmitted.

The FCS field 960 may include a sequence for CRC.

The polled SP interval field indicating the interval between service periods and/or interval in the transmission between SP-poll frames may be set to indicate that the interval value is 0 and/or Null. This may be to indicate that the polled service period is initiated by the SP-poll frame transmitted by the STA and at least one or more frames are to be transmitted from the AP within the service period. Further, the field thusly set may be to indicate not considering that after the polled service period initiated by the SP-poll frame, a polled service period is initiated again to transmit and receive a buffered frame.

The frame transmission/reception method by the power save mode STA based on the above-described SP-poll frame may be split into an immediate SP-poll mechanism and a deferred SP-poll mechanism depending on the response of the AP that has received the SP-poll frame.

Figure 10:
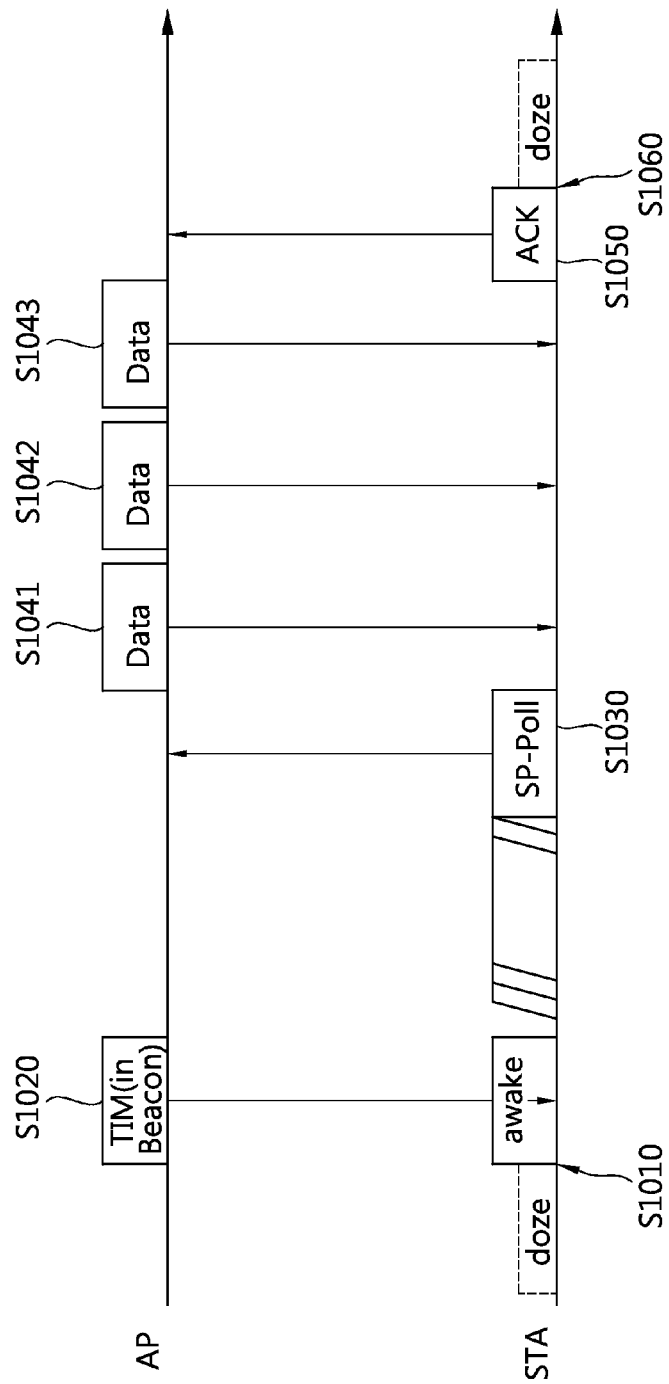
FIG. 10 is a view illustrating an example method of transmitting and receiving a frame by a STA operating in a power save mode according to another embodiment of the present invention.

FIG. 10 is a view illustrating an example method of transmitting and receiving a frame by a STA operating in a power save mode according to another embodiment of the present invention. The frame transmission and reception method shown in FIG. 10 may be an example of a frame transmission and reception method according to the immediate SP-poll mechanism.

Referring to FIG. 10, the STA that stays in the doze state enters into the awake state in order to receive a TIM element (S1010).

The STA receives the TIM element (S1020). The TIM element may be transmitted, included in a beacon frame. When receiving the TIM element, the STA may determine whether a bufferable frame for itself is being buffered based on the AID of the STA and the bitmap sequence of the partial virtual bitmap field included in the TIM element.

When identifying that a bufferable frame is being buffered, the STA obtains a channel access authority through contention and may send a request for transmission of a buffered frame to the AP through transmission of an SP-poll frame (S1030).

When receiving the SP-poll frame, the AP sends at least one or more buffered frames to the STA after the SIFS (S1041, S1042, and S1043). In such case, the AP may continuously transmit a plurality of buffered frames during a polled service period.

In case a specific polled service period is not configured through separate signaling between the AP and the STA, the EOSP value may be set as 1 in the last buffered frame that is transmitted from the AP to the STA during the polled service period. Through this, the polled service period between the STA and the AP may expire.

On the contrary, a specific polled service period may be configured through separate signaling between the AP and the STA. For this, the duration field of the SP-poll frame transmitted from the STA may apply. In such case, the polled service period may be initiated at a time when the STA sends the SP-poll frame or when the AP receives the SP-poll frame. The polled service period may be configured during the time period indicated by the duration field from the time of initiation. The AP may send a buffered frame in compliance with the duration of the polled service period. The STA may receive a buffered frame in accordance with the duration of the polled service period.

The STA may send an ACK frame to the AP (S1050). The STA enters into the doze state after transmitting the ACK frame (S1060). The ACK frame may be sent at a time when the polled service period expires.

Figure 11:
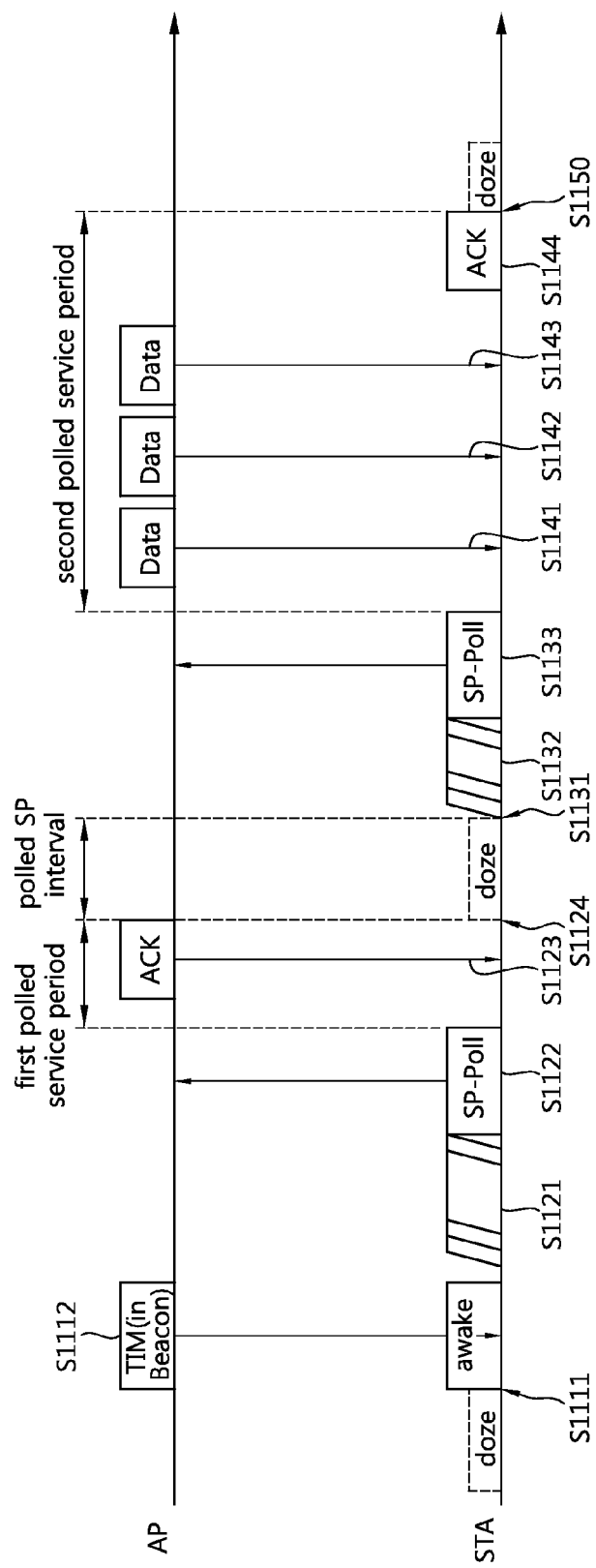
FIG. 11 is a view illustrating another example of a method of transmitting and receiving a frame by a STA operating in a power save mode according to another embodiment of the present invention.

FIG. 11 is a view illustrating another example of a method of transmitting and receiving a frame by a STA operating in a power save mode according to another embodiment of the present invention. The frame transmission and reception method shown in FIG. 11 is based on the deferred SP-poll mechanism.

Referring to FIG. 11, the STA that stays in the doze state enters into the awake state in order to receive a TIM element (S1111).

The STA receives the TIM element (S1112). The TIM element may be sent included in a beacon frame. When receiving the TIM element, the STA may determine whether a bufferable frame for itself is being buffered based on the AID of the STA and the bitmap sequence of the partial virtual bitmap field included in the TIM element.

When identifying that a bufferable frame is being buffered, the STA obtains a channel access authority through contention (S1121) and may send a request for transmission of a buffered frame to the AP through transmission of an SP-poll frame (S1122). As the SP-poll frame is transmitted, a first polled service period may be initiated.

Meanwhile, the AP, after receiving the SP-poll frame, might not send a buffered frame to the STA within the SIFS. In such case, the AP transmits an ACK frame after receiving the SP-poll frame (S1123).

When receiving the ACK frame in response to the transmitted SP-poll frame, the STA may recognize that the AP cannot send a buffered frame. In this case, the first polled service period that has been initiated by transmission of the SP-poll frame may expire. The STA receives an ACK frame and enters into the doze state (S1124).

Meanwhile, the STA enters into the awake state at a time indicated by the polled SP interval field of the SP-poll frame (S1131) and obtains a channel access authority through contention (S1132).

When obtaining the channel access authority, the STA requests that the AP send a frame through transmission of the SP-poll frame (S1133). A second polled service period begins through the transmission of the SP-poll frame.

Meanwhile, the AP may previously grasp the time when the STA intends to initiate the second polled service period through the polled SP interval field of the received SP-poll frame. As an example, in case the polled SP interval field indicates an interval between two polled service periods, it can be possible to know the time when the STA intends to initiate the second polled service period and receives a buffered frame by interpreting the polled SP interval field of the SP-poll frame in step S1122. As another example, in case the polled SP interval field indicates an interval when the STA that has already transmitted an SP-poll frame intends to send a subsequent SP-poll frame, the AP may know the time that the STA intends to send an SP-poll frame by construing the polled SP interval field included in the SP-poll frame in step S1122. However, FIG. 11 illustrates a polled SP interval when it is assumed that the polled SP interval field indicates the time when a next SP-poll frame is intended to be sent.

Accordingly, the AP may prepare for a buffered frame to be transmitted to the STA an SIFS after receiving the SP-poll frame. The AP may transmit one or more buffered frames to the STA during the second polled service period the SIFS after receiving the SP-poll frame (S1141, S1142, and S1143).

The duration of the second polled service period initiated by the STA transmitting the SP-poll frame (S1133) may be specified as the duration of the polled period described above in connection with FIG. 10. That is, the polled duration may be terminated by the AP sending out a buffered frame including an EOSP field set as 1. Or, the second polled duration may be specified by the duration indicated by the duration field of the SP-poll frame transmitted by the STA in step S1133.

The STA receives at least one or more frames from the AP, and in response, transmits an ACK frame (S1144). The ACK frame transmitted by the STA may be a block ACK as a response to acknowledge reception of at least one or more buffered frames. The STA may enter into the doze state after transmitting the ACK frame (S1150).

Although in FIG. 11 the second polled service period expires after the STA sends the ACK frame, the second polled service period may be terminated right before the STA transmits the ACK frame. That is, the STA may be configured to transmit an ACK frame to the AP when the second polled service period ends.

In the frame transmission and reception method shown in FIG. 11, the AP during the first polled service period transmits an ACK frame in response to the STA's SP-poll frame. Accordingly, during the first polled service period, a deferred SP-poll-based frame transmission and reception method is carried out. During the second polled service period, the AP sends at least one buffered frame in response to the STA's SP-poll frame. Accordingly, an immediate SP-poll-based frame transmission and reception method is conducted during the second polled service period.

By the frame transmission and reception method described above in connection with FIGS. 9 to 11, the STA may receive a frame from the AP while maintaining the awake state during the service period set by the SP-poll frame. By doing so, the STA may receive frames from at least one or more APs during the service period even without frequent switch between the awake state and the doze state. Accordingly, the STA's operation for data transmission and reception may secure more efficiency.

Hereinafter, a more generalized method for scheduling a service period during which an STA operating in a power save mode may receive at least one or more frames from an AP is described in detail.

For data transmission and reception between the AP and the STA, the AP or STA may pre-schedule a service period. Unlike configuring a polled SP interval and a polled service period by the polling based on the SP-poll frame including a polled SP interval field and duration field described in connection with FIGS. 10 and 11, the scheduling of the service period may have an interval between a plurality of service periods and two service periods pre-configured through mutual signaling before the AP and STA transmit and receive data so that data transmission and reception can be done between the AP and the STA during a subsequent service period.

According to the data transmission and reception method described in connection with FIGS. 10 and 11, the service period is initiated after the transmission of the SP-poll frame as shown in FIGS. 10 and 11. However, the polled service period may also be construed as initiated from the time when the STA enters into the awake state in order transmit an SP-poll frame. However, even in such case, the duration of the polled service period may be determined by a value set in the duration field of the SP-poll frame or time when the AP and/or STA sends an ACK frame. In case a service period is interpreted in such way, the polled SP interval may be understood as the interval between two polled service periods.

By pre-scheduling a service period of the STA, the AP may previously grasp information relating to the STA's scheduled service period and may prepare for data to be sent to the STA. The STA may shift to the awake state or doze state according to the scheduled service period. That is, when the service period is initiated, the STA may enter into the awake state to maintain the state where the STA can transmit and receive data, and when the service period is ended, the STA may enter into the doze state to save unnecessary power consumption. In order to pre-schedule a service period, the AP and the STA may previously share scheduling information of the service period.

Figure 12:
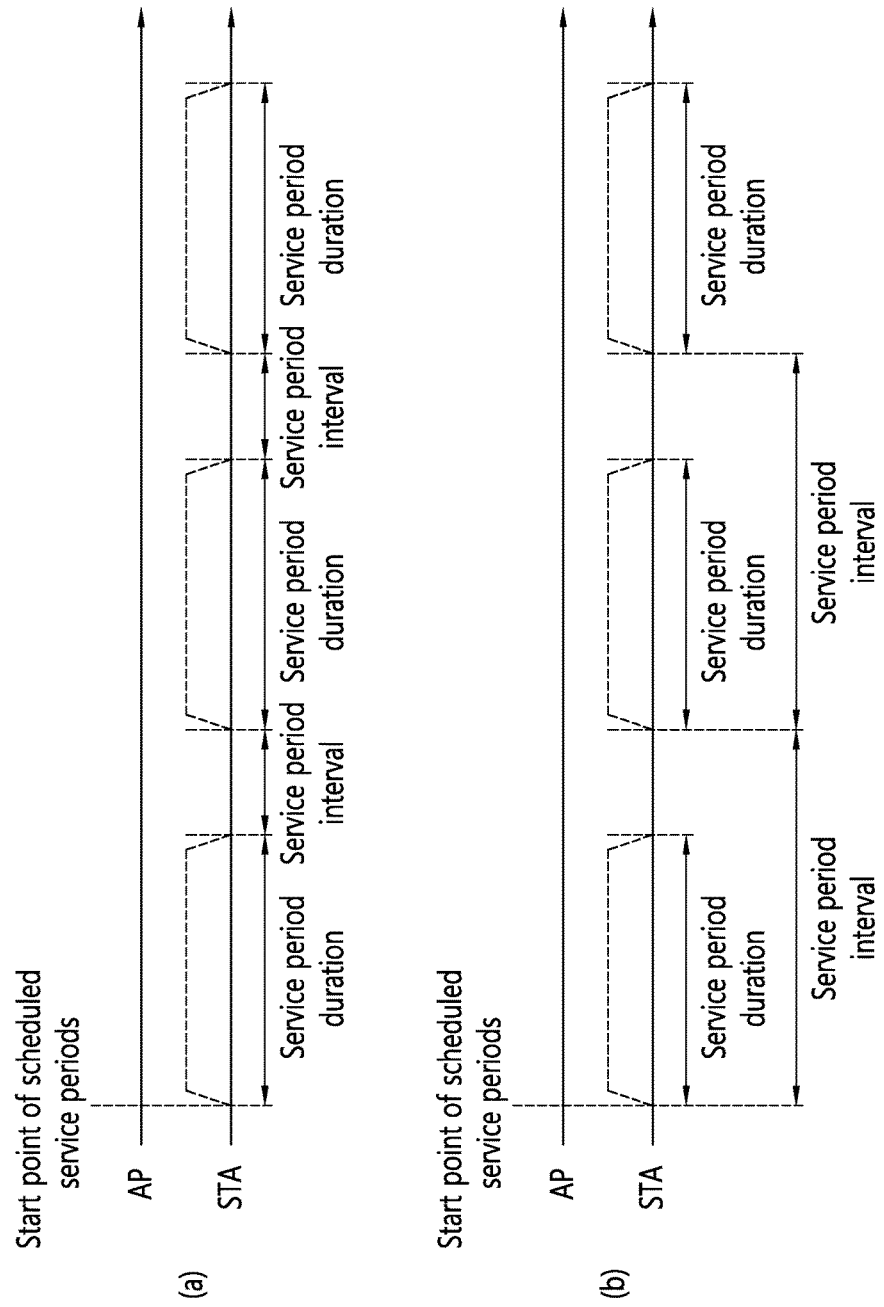
FIG. 12 is a view illustrating example scheduled service periods according to an embodiment of the present invention.

The scheduling of a service period may be achieved by indicating an interval between service periods and information indicating the duration of a service period, and a scheduled service period configured thus is as shown in FIG. 12.

FIG. 12 is a view illustrating example scheduled service periods according to an embodiment of the present invention.

Referring to FIG. 12, the scheduled service periods each may be represented with a start point, duration, and a service period interval.

In sub-figures (a) and (b) of FIG. 12, the service period duration means the duration during which an AP and/or STA accesses a channel to be able to transmit and receive data. On the contrary, in the sub-figures, the service period intervals may be construed as denoting different time intervals from each other. In the sub-figure (a), the service period interval may mean the interval between the end point of a first service period and the start point of a subsequent service period. In the sub-figure (b), the service period interval may refer to the interval between the start point of a first service period and the start point of a subsequent service period.

It can be seen from the sub-figures (a) and (b) of FIG. 12, the service periods are scheduled in the same way. Accordingly, the STA may enter into the awake state at the time when a service period is initiated to thereby maintain the state where transmission and reception is possible, and may switch back to the doze state at the time when the service period is ended.

Meanwhile, in order to schedule such service period, the step may need to be done for configuring a service period so as to schedule the service periods between the AP and the STA. This can be done by making the AP and STA share information on the times when the scheduled service periods are initiated, the interval between service periods, and the duration of a service period.

The start points of all the scheduled service periods may be indicated by the AP or STA. A start point being indicated by the AP can be done by transmitting a specific frame. The specific frame may be an existing one such as a beacon frame or may be newly defined in relation to indicating the start of a scheduled service period. Hereinafter, frames for indicating that a scheduled service period is started are collectively referred to as scheduled SP start request frames. When receiving a scheduled service period start request frame, the STA may send an ACK frame or null frame to the AP in response. Hereinafter, the ACK frame and null frame that may be sent in response to a scheduled service period start request are collectively referred to as a scheduled service period start response frame.

Meanwhile, the STA may indicate the start point of a scheduled service period. The STA may send a scheduled service period start request frame to the AP in order to indicate the start points of the scheduled service periods. The scheduled service period start request frame may be an existing frame such as a PS-poll frame or may be the above-described SP-poll frame. When receiving the scheduled service period start request frame from the STA, the AP may send a scheduled service period start response frame to the STA in response. The scheduled service period start response frame may be an ACK frame or null frame.

Figure 13:
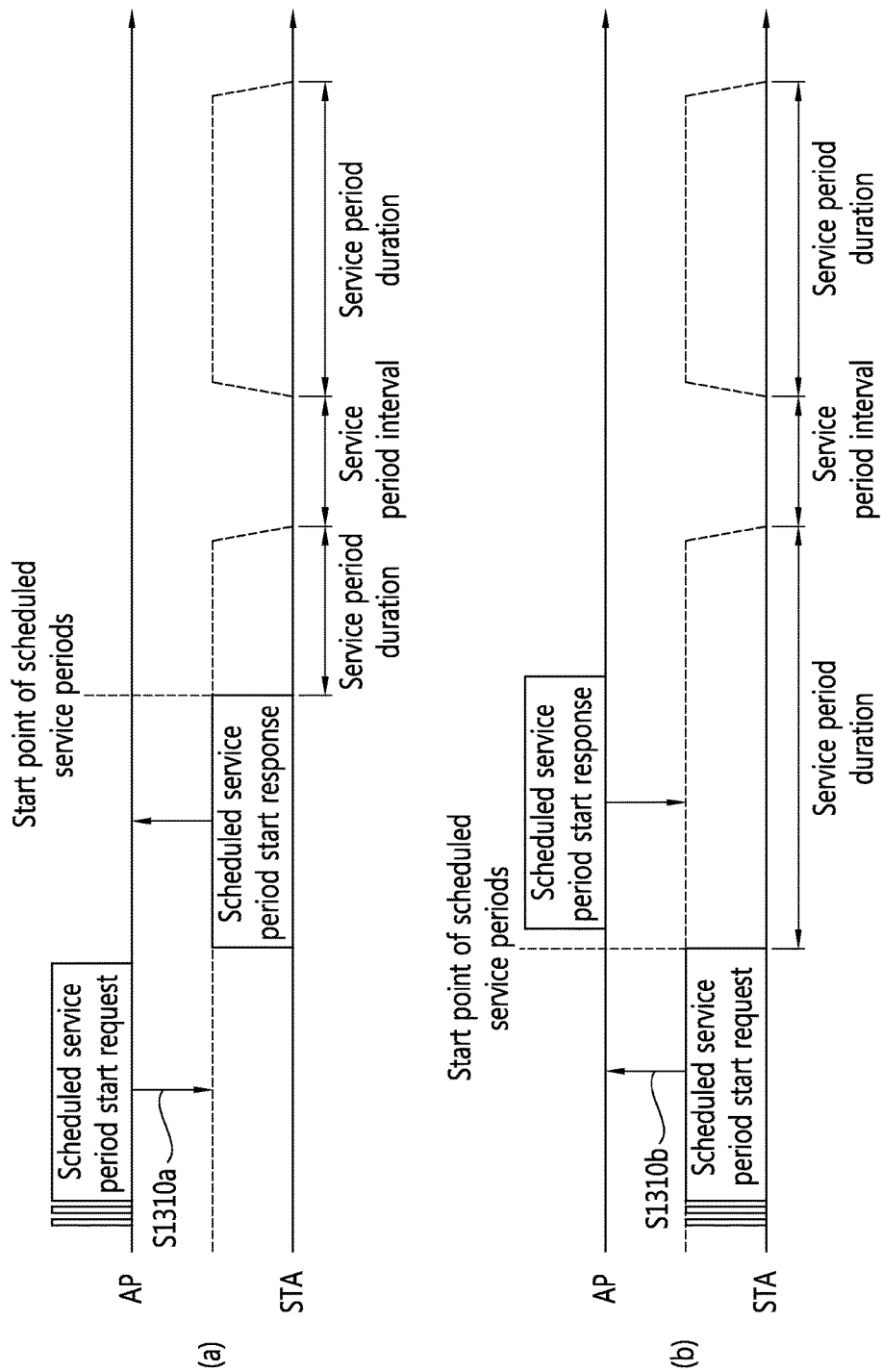
FIG. 13 may be referenced for the above-described method of starting a scheduled service period.

FIG. 13 may be referenced for the above-described method of starting a scheduled service period.

FIG. 13 is a view illustrating a method of indicating the start of a scheduled service period according to an embodiment of the present invention.

A sub-figure (a) of FIG. 13 illustrates an example where a service period is started by an AP. The AP sends a scheduled service period start request frame indicating that a scheduled service period is started to the STA (S1310a). The scheduled service period start request frame may be a beacon frame and/or a newly defined for the request.

In response to the scheduled service period start request frame, the STA sends a scheduled service period start response frame to the AP (S1320a). The scheduled service period start response frame may be an ACK frame and/or a null frame.

According to the above example, it can be seen that the scheduled service period is initiated subsequent to the STA's response to the AP's request.

A sub-figure (b) of FIG. 13 illustrates an example where the start of a service period is indicated by the STA. The STA may send a scheduled service period start request frame indicating that the scheduled service period is started to the AP (S1310b). The scheduled service period start request frame may be a PS-poll frame and/or an SP-poll frame.

In response to the scheduled service period start request frame, the AP sends a scheduled service period start response frame to the STA (S1320b). The scheduled service period start response frame may be an ACK frame and/or a null frame.

According to the above example, the scheduled service period may be seen to be initiated for its transmission, subsequent to transmission of the STA's scheduled service period start request frame.

Meanwhile, although in the example illustrated in FIG. 13 the service period interval is the interval between the end point of a previous service period and the start point of a subsequent service period, the service period interval is not limited thereto. The service period interval may be an interval between the start points of two service periods.

As described above, the scheduling information on the started scheduled service periods may be implemented by service period duration and a service period interval, and such information may be determined and shared by the STA and/or AP. For this, the service period duration information and service period interval information may be determined by the STA and be then sent to the AP or may be determined by the AP and sent to the STA. The service period duration information and the service period interval information may be sent included in a scheduled service period start request frame or scheduled service period start response frame. In such case, the service period duration-related information may be implemented in a separate service period duration field or in the duration field of the scheduled service period start request frame and/or scheduled service period start response frame. The service period interval-related information may be implemented in a separate service period interval field and may be included in the scheduled service period start request frame and/or scheduled service period start response frame.

Meanwhile, the service period duration-related information and the service period interval-related information may be implemented as scheduled service period information elements and may be included in a combined response frame or probe response frame. If the scheduled service period start request frame or scheduled service period start response frame does not contains information explicitly indicating the service period duration and service period interval, the service period duration and service period interval may be configured by the information included in the scheduled service period information elements.

Figure 14:
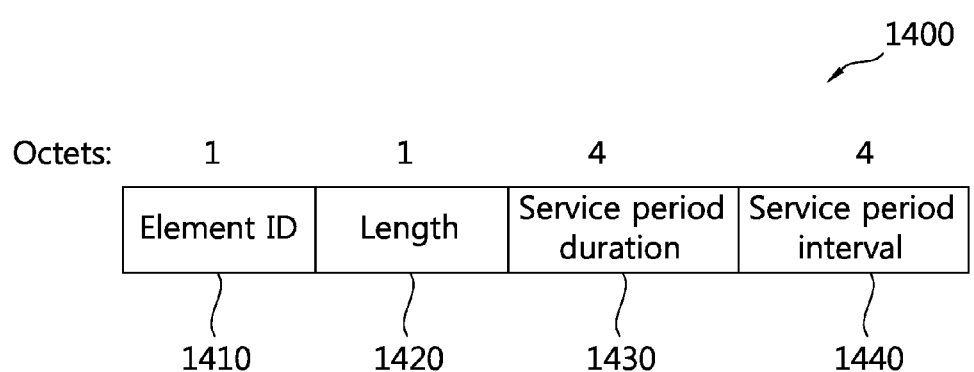
FIG. 14 may be referenced for the format of the format of the scheduled service period information element.

FIG. 14 may be referenced for the format of the format of the scheduled service period information element.

FIG. 14 is a block diagram illustrating the format of a scheduled service period information element according to an embodiment of the present invention.

Referring to FIG. 14, the scheduled service period information element 1400 includes an element ID field 1410, a length field 1420, a service period duration field 1430 and a service period interval field 1440.

The element ID field 1410 may be configured to indicate that the information element is a scheduled service period information element.

The length field 1420 may be configured to indicate the entire length of a bit sequence constituting the service period duration field 1430 and the service period interval field 1440.

The service period duration field 1430 may be configured to include the service period duration-related information and the service period interval field 1440 may be configured to include service period interval-related information.

The time when each of the above-scheduled service periods is terminated needs to be shared by the AP and the STA. Absent from explicit signaling, each service period expires when the duration of the service period is terminated. Meanwhile, each service period may be terminated by explicit signaling by the AP and/or STA before its duration.

Figure 15:
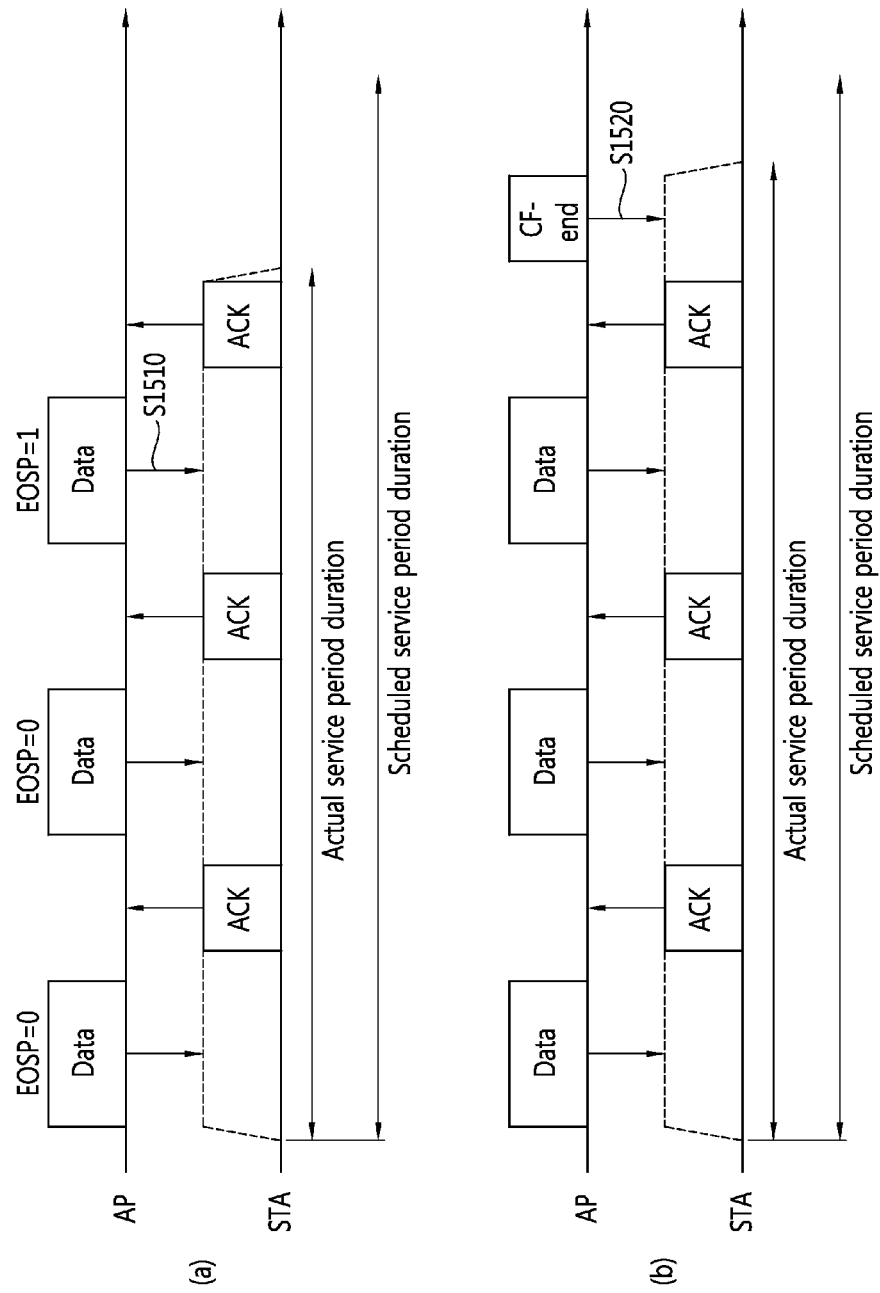
FIG. 15 illustrates an example method of terminating a service period by an AP according to an embodiment of the present invention.

FIG. 15 illustrates an example method of terminating a service period by an AP according to an embodiment of the present invention.

Referring to a sub-figure (a) of FIG. 15, the AP that sends at least one data frame during a service period, when intending to terminate the service period, may send the last frame, with the EOSP field of the last frame set as 1 (S1510). In this case, the time when the service period is actually terminated may be determined by transmission of an ACK frame from the STA in response to a data frame including the EOSP field set as 1.

Referring to a sub-figure (b) of FIG. 15, the AP which sends at least one data frame during a service period, when desiring to terminate the service period, may send a CF-end frame (S1520). The CF-end frame is a frame that is sent by an AP and/or STA that may access a channel and have an authority to send a frame, such as a Contention Free Period (CFP) or Transmission Opportunity (TXOP) in order to release the access authority. Accordingly, the CF-end frame may be applied also to a service period so that the AP desiring to terminate the service period sends the CF-end frame. The time when the service period is actually terminated may be determined by transmission of the CF-end frame.

Figure 16:
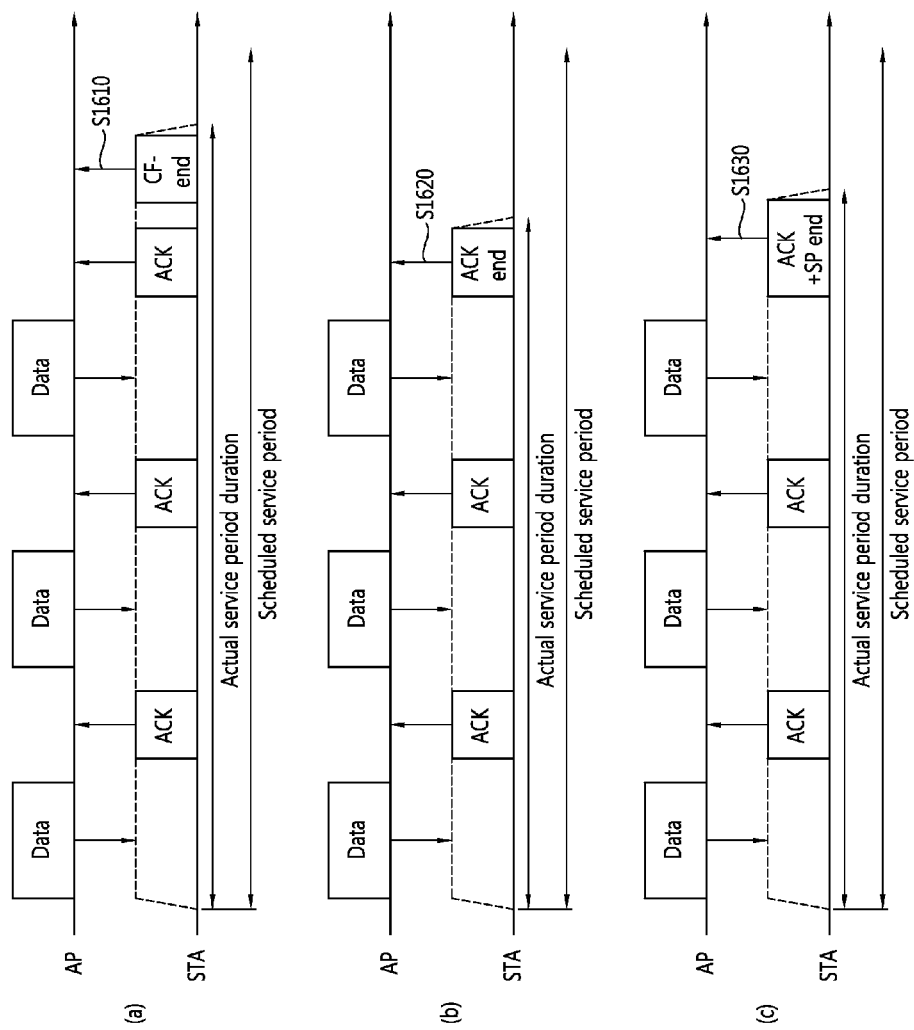
FIG. 16 illustrates an example method of terminating a service period by an STA according to an embodiment of the present invention.

FIG. 16 illustrates an example method of terminating a service period by an STA according to an embodiment of the present invention.

Referring to a sub-figure (a) of FIG. 16, the STA that receives at least one data frame during a service period, when desiring to terminate the service period, may send a CF-end frame after transmitting an ACK frame in response to the received data frame (S1610). The time when the service period is actually terminated may be determined by transmission of the CF-end frame by the STA.

Referring to a sub-figure (b) of FIG. 16, the STA that receives at least one data frame during a service period, when desiring to terminate the service period, may send an ACK frame that includes information indicating that the service period is to be terminated (S1620). The time when the service period is actually terminated may be determined by transmission of the ACK frame including the information indicating the termination of the service period.

Referring to a sub-figure (c) of FIG. 16, the STA that receives at least one data frame during a service period, when desiring to terminate the service period, may send an ACK+SP end frame (S1630). The ACK+SP end frame is a newly defined frame that includes both a function of acknowledging reception of the data frame and a function indicating the end of the service period. The time when the service period is actually terminated may be determined by transmission of the ACK+SP end frame.

Meanwhile, the AP and/or STA, when desiring to terminate all scheduled service periods, may conduct signaling on this therebetween. The AP and/or STA may explicitly indicate the end of all the scheduled service periods.

Figure 17:
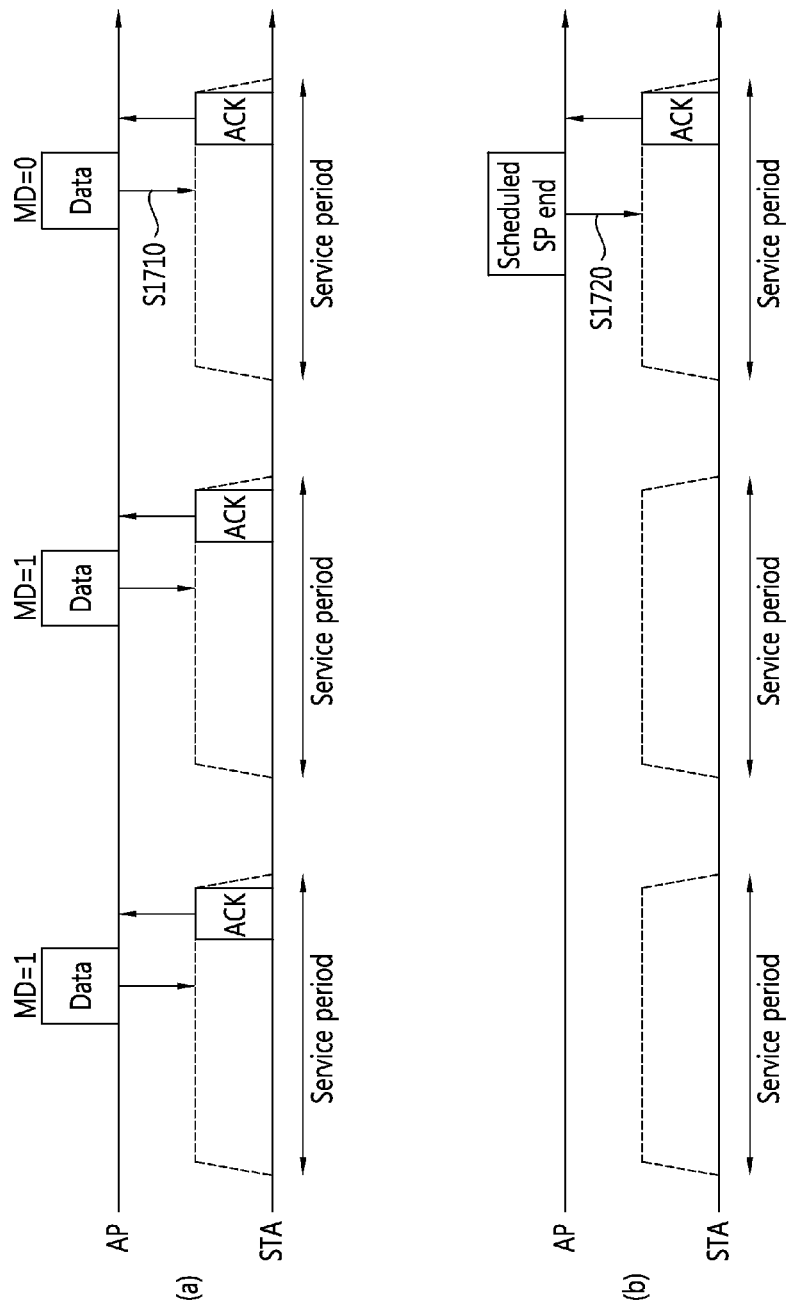
FIG. 17 shows an example method of terminating all the scheduled service periods by an AP according to an embodiment of the present invention.

FIG. 17 shows an example method of terminating all the scheduled service periods by an AP according to an embodiment of the present invention.

Referring to a sub-figure (a) of FIG. 17, the AP may end all the scheduled service periods based on the More Data (MD) field of a data frame. The MD field indicates whether there is more data to be transmitted by a sender. The MD field being set as 0 indicates that there is no more data to be sent. Accordingly, the AP may end all the scheduled service periods by sending a data frame including the MD field set as 0 (S1710). Meanwhile, the time when all the scheduled service periods are terminated may be determined by an ACK frame that is transmitted in response to transmission of the data frame including the MD field set as 0.

Referring to a sub-figure (b) of FIG. 17, the AP may end all the scheduled service periods by sending a frame indicating termination of all the scheduled service periods to the STA (S1720). The frame may be a scheduled service period end frame that is newly defined to end all the scheduled service periods. The time when all the scheduled service periods are terminated may be determined by the STA's response (e.g., ACK) to the service period end frame.

Figure 18:
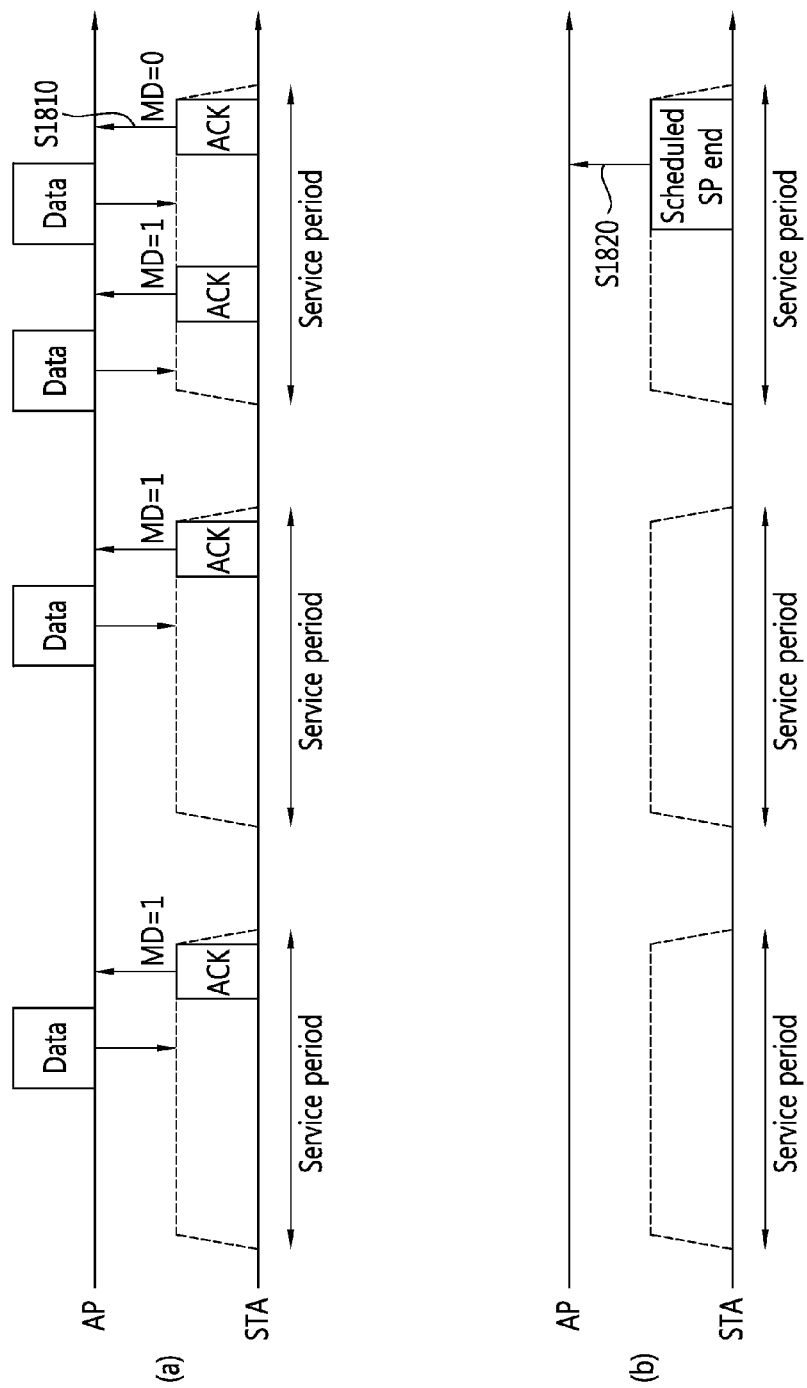
FIG. 18 shows an example method of terminating all the scheduled service periods by an STA according to an embodiment of the present invention.

FIG. 18 shows an example method of terminating all the scheduled service periods by an STA according to an embodiment of the present invention.

Referring to a sub-figure (a) of FIG. 18, the above-described MD field may be set as 0 and an ACK frame including the MD field may be sent to the AP so as to terminate all the scheduled service periods (S1810). The time when all the scheduled service periods are terminated may be determined by transmission of the ACK frame including the MD field set as 0.

Referring to a sub-figure of FIG. 18, the STA may end all the scheduled service periods by sending a frame indicating termination of all the scheduled service periods to the AP (S1820). The frame may be the above-described scheduled service period end frame. The time when all the scheduled service periods are terminated may be determined by transmission of the service period end frame.

Methods of scheduling service periods have been described thus far with reference to FIGS. 12 to 18. In the above-described embodiments of scheduling methods, each service period is initiated per information on the service period duration and service period interval associated with all the scheduled service periods, rather than by individual indications. Further, the start point of the whole service periods is started by the AP and/or STA's explicit signaling.

Meanwhile, a service period individual scheduling method may also be offered which is based on each service period being scheduled by an individual indication. Meanwhile, a service period individual scheduling method may be conducted alongside a service period in the data transmission and reception method based on an SP-poll frame, specifically described above in connection with FIGS. 9 to 11. However, a general service period individual scheduling method is hereinafter described.

Figure 19:
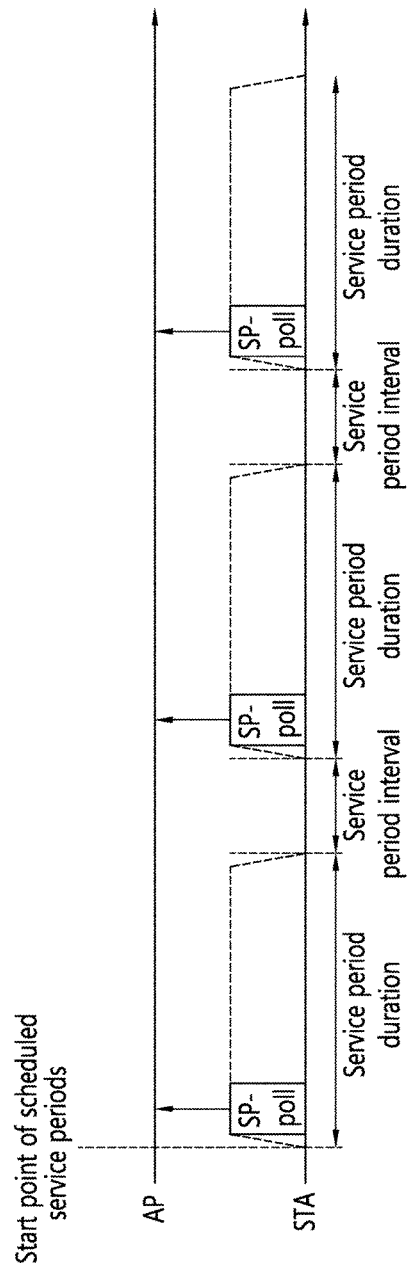
FIG. 19 is a view illustrating examples of individually scheduled service periods according to an embodiment of the present invention.

FIG. 19 is a view illustrating examples of individually scheduled service periods according to an embodiment of the present invention.

Referring to FIG. 19, the scheduled service periods may be represented with the start point of the whole scheduled service periods, service period duration and service period interval. However, in contrast to the scheduling methods described above in connection with FIGS. 12 to 18, each service period is individually scheduled.

The STA sends an SP-poll frame at the start point of each service period. The STA informs that each service period is initiated and requests that the AP transmit data by sending the SP-poll frame.

Meanwhile, information on the start point of the whole scheduled service periods may be shared by the AP and STA. Like the scheduling methods described above in connection with FIGS. 12 to 18, the start point of the whole scheduled service periods may be indicated by the AP or STA. The initiation of the scheduled service period may be conducted when the AP and/or STA sends a scheduled service period start request frame, and in response, the STA and/or AP sends a scheduled service period start response frame.

In case the request is sent by the AP, the start point of the whole scheduled service periods may be initiated by the STA's response. In case the request is made by the STA, the start point of the whole scheduled service periods may be started by the STA's request.

Meanwhile, in the example illustrated in FIG. 19, the service period interval is shown to be an interval between the end point of a previous service period and the start point of a subsequent service period. However, the service period interval is not limited thereto. The service period interval may be an interval between the start points of two service periods.

Scheduling information on each service period may be implemented as service period duration and service period interval. Meanwhile, such information may be determined and shared by the STA and/or AP.

In case the STA determines scheduling information on each service period, the service period duration may be determined by the duration field of an SP-poll frame transmitted by the STA within the current service period. Further, the service period interval may be determined by the polled SP interval field included in the SP-poll frame previously sent by the STA. The current service period may be maintained for a time indicated by the duration field of the SP-poll frame from when the SP-poll frame is sent by the STA. A next service period may be initiated by the time determined by the polled SP interval field by the SP-poll frame.

In case the scheduling information is determined by the AP, the service period duration may be determined by a response to the SP-poll frame sent by the STA within the current service period or the service period duration field of the scheduled service period information element sent by the AP for separate signaling. Also, the service period interval may be sent by the service period interval field of the service period information element that was sent by the AP prior to the current service period. That is, the service period, when already initiated, may last for the time indicated by the service period duration field from when the service period information element was sent by the AP. Further, a next service period may be initiated at the time determined by the service period interval field of the service period information element. Meanwhile, the service period information element may be sent, included in a specific frame newly defined, a frame (e.g. an ACK frame) sent in response to the SP-poll frame transmitted by the STA or a data frame sent during a service period.

As described above, each service period individually scheduled, in case there is no explicit signaling, is ended when the duration of each service period expires. Meanwhile, each service period may also be terminated by the AP and/or STA's explicit signaling before its duration.

Figure 20:
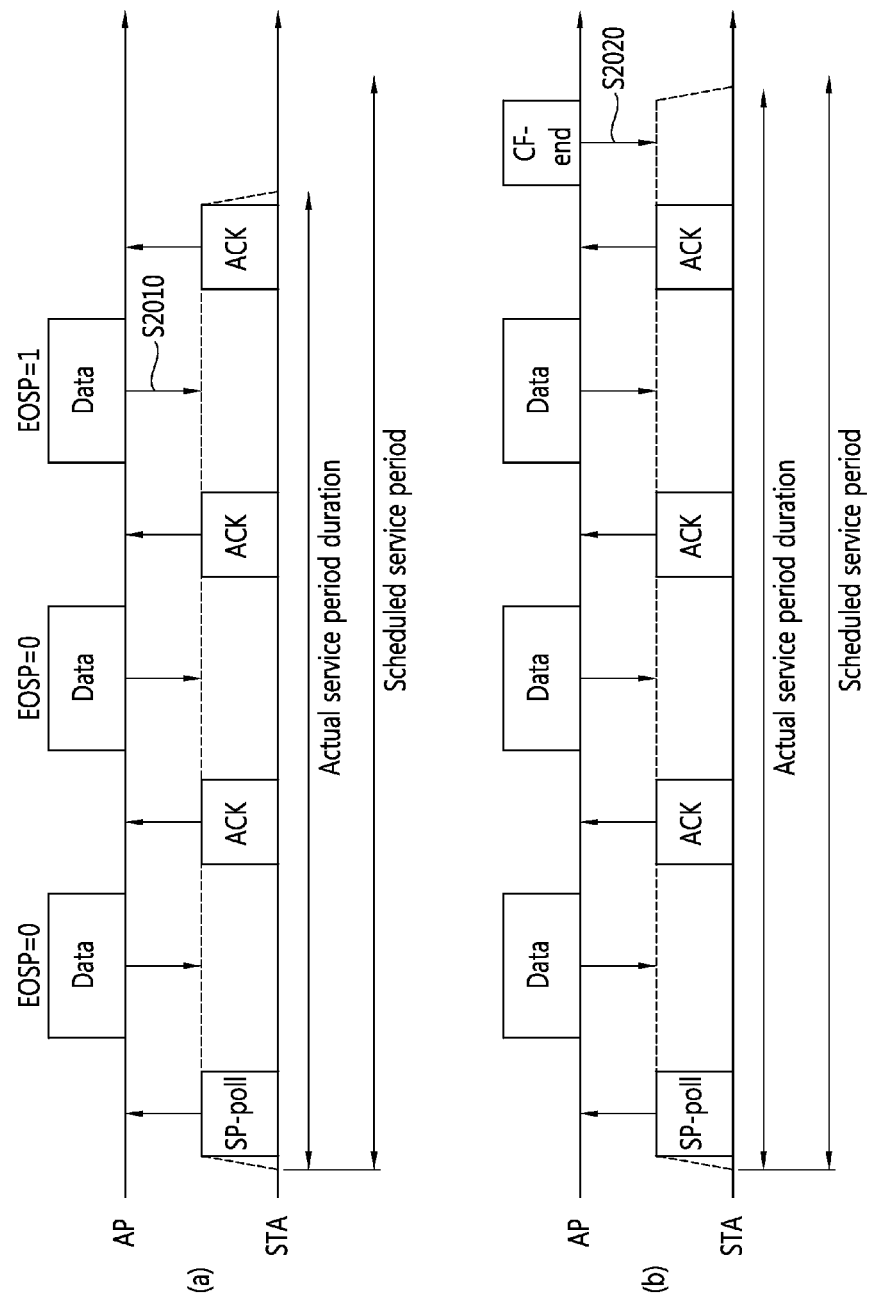
FIG. 20 shows an example method of terminating an individually scheduled service period by an AP according to an embodiment of the present invention.

FIG. 20 shows an example method of terminating an individually scheduled service period by an AP according to an embodiment of the present invention.

Referring to a sub-figure (a) of FIG. 20, the AP that sends at least one data frame during a service period, when desiring to terminate the service period, may send the last frame with the EOSP field of the last frame set as 1 (S2010). In this case, the time when the service period is actually terminated may be determined by the STA sending an ACK frame in response to the last frame sent by the AP, i.e., the data frame including the EOSP field set as 1.

Referring to a sub-figure (b) of FIG. 20, the AP that sends at least one data frame during a service period, when desiring to terminate the service period, may send a CF-end frame (S2020). Accordingly, the CF-end frame may be applied to the service period so that the AP desiring to end the service period may transmit the CF-end frame. The time when the service period is actually terminated may be determined by transmission of the CF-end frame.

Figure 21:
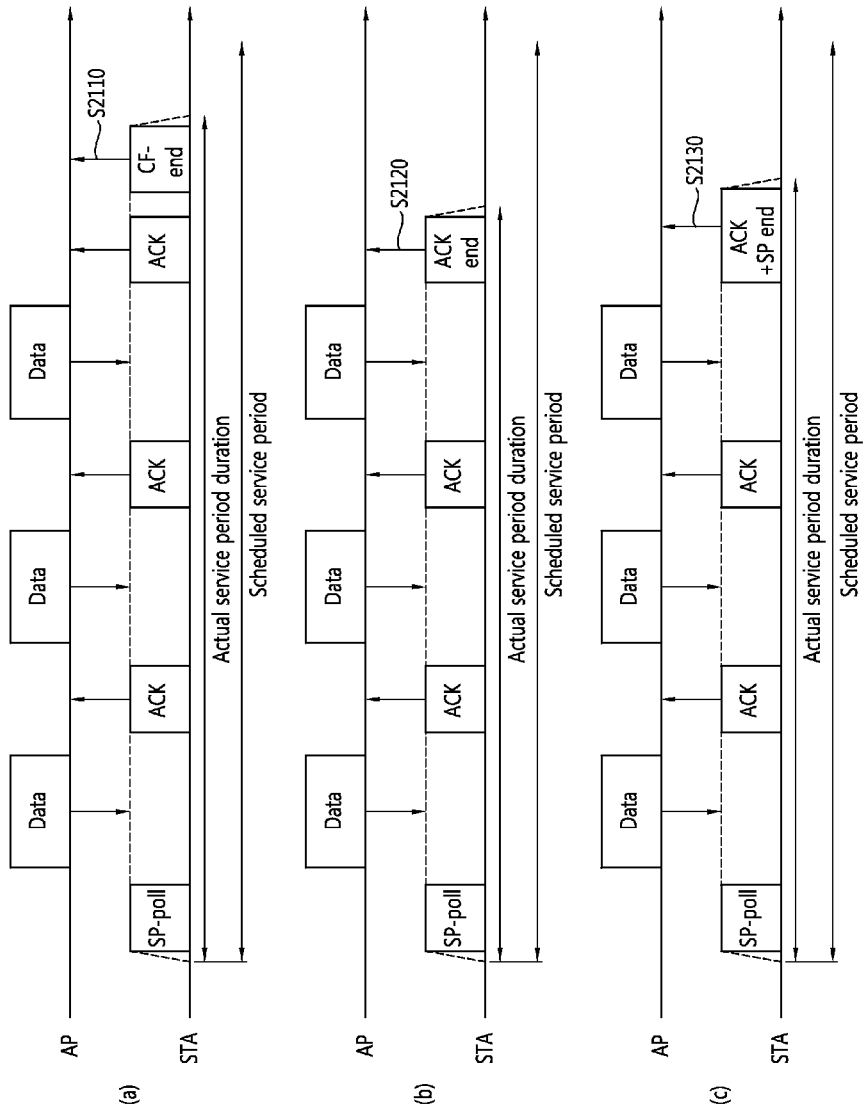
FIG. 21 shows an example method of terminating a service period by an STA according to an embodiment of the present invention.

FIG. 21 shows an example method of terminating a service period by an STA according to an embodiment of the present invention.

Referring to a sub-figure (a) of FIG. 21, the STA that receives at least one data frame during a service period, when desiring to terminate the service period, may send an ACK frame in response to the received data frame and then transmit a CF-end frame (S2110). The time when the service period is actually terminated may be determined by transmission of the CF-end frame by the STA.

Referring to a sub-figure (b) of FIG. 21, the STA that receives at least one data frame during a service period, when desiring to terminate the service period, may send an ACK frame having information indicating that the service period is to be terminated (S2120). The time when the service period is actually terminated may be determined by transmission of the ACK frame including the information indicating that the service period is terminated.

Referring to a sub-figure (c) of FIG. 21, the STA that receives at least one data frame during a service period, when desiring to terminate the service period, may send an ACK+SP end frame (S2130). The time when the service period is actually terminated may be determined by transmission of the ACK+SP end frame.

Meanwhile, in case the AP and/or STA desire to end all the scheduled service periods, the AP and/or STA may conduct signaling on this therebetween. The AP and/or STA may explicitly indicate the end of the whole scheduled service periods.

Figure 22:
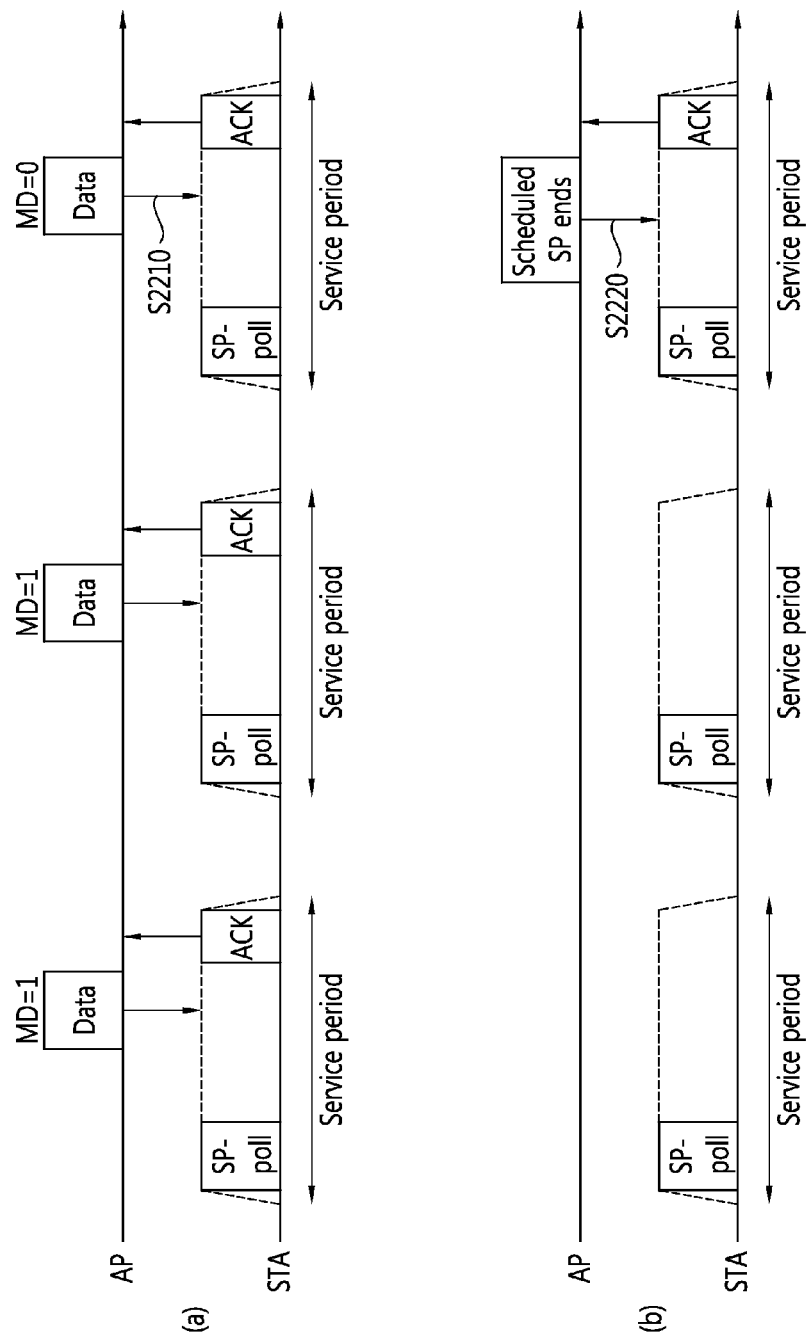
FIG. 22 shows an example method of terminating all the scheduled service periods by an AP according to an embodiment of the present invention.

FIG. 22 shows an example method of terminating all the scheduled service periods by an AP according to an embodiment of the present invention.

Referring to a sub-figure (a) of FIG. 22, the AP may terminate all the scheduled service periods based on the MD field of a data frame. The AP may end all the scheduled service periods by sending a data frame including an MD field set as 0 (S2210). Meanwhile, the time when all the scheduled service periods are ended may be determined by an ACK frame sent in response to the transmission of the data frame including the MD field set as 0.

Referring to a sub-figure (b) of FIG. 22, the AP may end all the scheduled service periods by sending a frame indicating transmission of all the scheduled service periods to the STA (S2220). The frame may be a scheduled service period end frame newly defined to terminate all the scheduled service periods. The time when all the scheduled service periods are terminated may be determined by the STA's response (e.g., ACK) to transmission of the station end frame.

Figure 23:
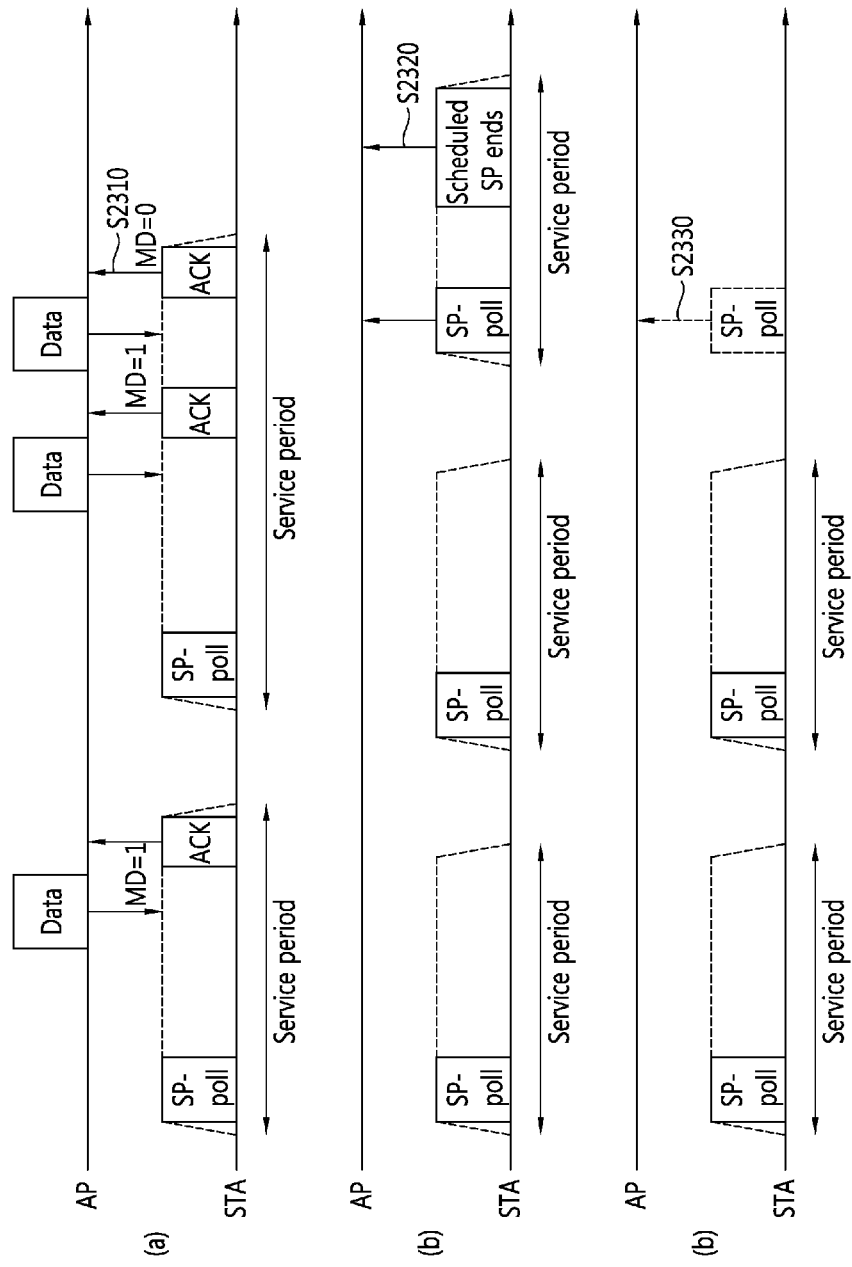
FIG. 23 shows an example method of terminating all the scheduled service periods by an STA according to an embodiment of the present invention.

FIG. 23 shows an example method of terminating all the scheduled service periods by an STA according to an embodiment of the present invention.

Referring to a sub-figure (a) of FIG. 23, the above-described MD field may be set as 0, and the ACK frame including the MD field may be sent to the AP so as to end all the scheduled service periods (S2310). The time when the whole scheduled service periods are terminated may be determined by transmission of the ACK frame including the MD field set as 0.

Referring to a sub-figure (b) FIG. 23, the STA may end all the scheduled service periods by sending a frame indicating transmission of the whole scheduled service periods to the AP (S2320). The frame may be the above-described scheduled service period end frame. The time when the whole scheduled service periods are terminated may be determined by transmission of the station end frame.

Meanwhile, in the individual service period scheduling method, the STA sends an SP-poll frame at the time when a next service period is initiated. The AP sends data to the STA during a service period after receiving the SP-poll frame. In contrast, the STA may terminate all the scheduled service periods by stop sending the SP-poll frame to the AP. For this, a sub-figure (c) of FIG. 23 may be referenced. The AP may recognize that all the scheduled service periods have been terminated when not receiving the SP-poll frame from the STA within a predetermined time period after the service period is scheduled to be initiated.

Based on the service period scheduling described above in connection with the drawings, the STA may operate, switching between the awake state and the doze state in compliance with the scheduled service period. The STA may exchange data with the AP at least once or more during a scheduled service period. Such operation leads to the STA being able to enhance the efficiency of power saving and data transmission/reception.

Figure 24:
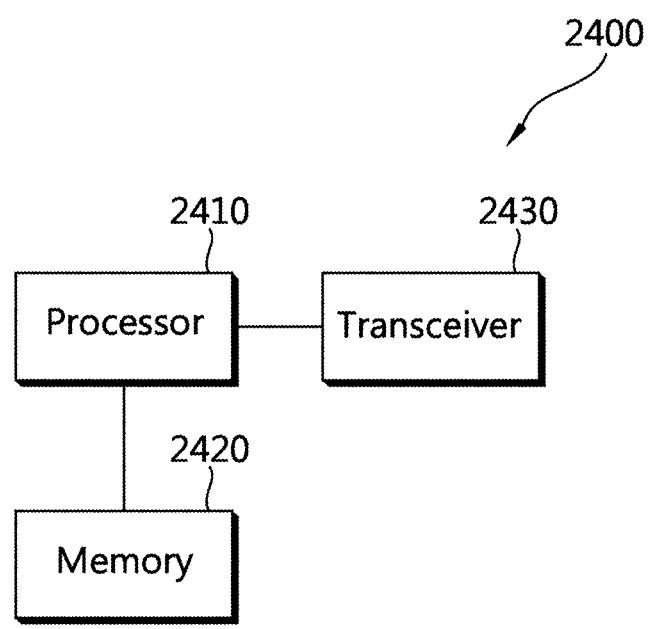
FIG. 24 is a block diagram illustrating a wireless device in which an embodiment of the present invention may be implemented.

FIG. 24 is a block diagram illustrating a wireless device in which an embodiment of the present invention may be implemented.

Referring to FIG. 24, the wireless device 2400 includes a processor 2410, a memory 2420, and a transceiver 2430. The transceiver 2430 transmits and/or receives radio signals and implements the physical layer of IEEE 802.11. The processor 2410 may be operatively coupled with the transceiver 2430. The processor 2410 may be configured to perform service period scheduling and a service period scheduling-based data transmission and reception method according to an embodiment of the present invention described above in connection with FIGS. 8 to 23.

The processor 2410 and/or transceiver 2430 may include an ASIC (Application-Specific Integrated Circuit), other chipset, a logic circuit, and/or a data processing device. When an embodiment is implemented in software, the above-described schemes may be embodied in modules (processes or functions) performing the above-described operations. The modules may be stored in the memory 2420 and executed by the processor 2410. The memory 2420 may be included in the processor 2410 or may also be positioned outside the processor 2410 and be operatively coupled with the processor 2410 via various means.

In the above exemplary system, the methods have been described in conjunction with flowcharts having a series of steps or blocks. However, the present invention is not limited to the order of the steps, and some steps may occur simultaneously or in an order different from the above-described steps. It may be understood by one of ordinary skill in the art that the steps in the flowcharts are not exclusive and some other steps may be added or one or more of the steps in the flowcharts may be deleted without affecting the scope of the present invention.

What is claimed is:
1. A method for scheduling a service period in a wireless LAN system, the method comprising:
receiving, at a first wireless station, a beacon frame including a traffic indication map (TIM) from an access point (AP);
if the TIM indicates that there is a buffered frame for the first wireless station, transmitting, at the first wireless station, a service period poll frame including a duration field of a polled service period, a basic service set identifier (BSSID) field, and a transmitter address (TA) field, wherein the BSSID field indicates an address of the AP, and the TA field indicates an address of the first wireless station, wherein the duration field indicates a time duration used for transmitting a buffered frame by the AP if the service period poll frame is received by the AP, wherein the duration field indicates a time duration used for a Network Allocation Vector (NAV) of a second wireless station that does not transmit the service period poll frame if the service period poll frame is received by the second wireless station;
in response to the service period poll frame, receiving, at the first wireless station, an ACK message from the AP; and in response to the ACK message, entering, at the first wireless station, into a doze state.

2. The method of claim 1, further comprising:

receiving, at the first wireless station, an indicator indicating an end of the service period; and in response to the indicator, entering, at the first wireless station, into the doze state.

3. A first wireless station comprising:

a transceiver transmitting and receiving a radio signal; and a processor operatively coupled with the transceiver, that:

controls the transceiver to receive a beacon frame including a traffic indication map (TIM) from an access point (AP);

if the TIM indicates that there is a buffered frame for the wireless station, controls the transceiver to transmit a service period poll frame including a duration field of a polled service period, a basic service set identifier (BSSID) field, and a transmitter address (TA) field, wherein the BSSID field indicates an address of the AP, and the TA field indicates an address of the first wireless station, wherein the duration field indicates a time duration used for transmitting a buffered frame by the AP if the service period poll frame is received by the AP, wherein the duration field indicates a time duration used for a Network Allocation Vector (NAV) of a second wireless station that does not transmit the service period poll frame if the service period poll frame is received by the second wireless station;

in response to the service period poll frame, controls the transceiver to receive an ACK message from the AP; and in response to the ACK message, enters into a doze state.

4. The first wireless station of claim 1, wherein the processor further:

controls the transceiver to receive an indicator indicating an end of the service period; and in response to the indicator, enters into the doze state.

* * * * *